(12) United States Patent
Muramatsu et al.

(10) Patent No.: US 6,254,069 B1
(45) Date of Patent: Jul. 3, 2001

(54) ACTIVE VIBRATION DAMPING SYSTEM HAVING CONTROLLER FOR GENERATING PULSE SIGNAL FOR OSCILLATION OF OSCILLATING PLATE PARTIALLY DEFINING FLUID CHAMBERS

(75) Inventors: Atsushi Muramatsu; Yoshihiko Hagino; Hiroyuki Ichikawa, all of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/204,217

(22) Filed: Dec. 2, 1998

(30) Foreign Application Priority Data

Dec. 5, 1997 (JP) .................................. 9-335843
Mar. 23, 1998 (JP) ................................. 10-074015

(51) Int. Cl.⁷ ................................ B60K 5/12; F16F 5/00
(52) U.S. Cl. ...................... 267/140.14; 267/136; 248/550
(58) Field of Search ..................... 188/378, 379; 267/136, 140.14, 140.15; 248/550, 636

(56) References Cited

U.S. PATENT DOCUMENTS

| | | | |
|---|---|---|---|
| 4,638,983 | * | 1/1987 | Idigkiet et al. ................ 267/140.14 |
| 4,869,474 | * | 9/1989 | Best et al. ............................ 267/136 |
| 5,028,039 | * | 7/1991 | Sato .................................... 248/550 |
| 5,333,846 | * | 8/1994 | Goto et al. ..................... 267/140.14 |
| 5,344,129 | * | 9/1994 | Ide et al. ........................ 267/140.14 |
| 5,427,347 | * | 6/1995 | Swanson et al. .................... 248/550 |
| 5,647,579 | * | 7/1997 | Satoh ............................. 267/140.14 |
| 5,718,417 | * | 2/1998 | Aoki ............................... 267/140.14 |
| 5,779,231 | * | 7/1998 | Okazaki et al. ................ 267/140.14 |
| 5,905,317 | * | 5/1999 | Aoki ................................... 310/51 |
| 5,947,456 | * | 9/1999 | Aoki ............................... 267/140.14 |
| 6,010,120 | * | 1/2000 | Nagasawa ....................... 267/140.14 |
| 6,017,024 | * | 1/2000 | Muramatsu et al. ............ 267/140.14 |

FOREIGN PATENT DOCUMENTS

| | | | |
|---|---|---|---|
| 2 164 416 | * | 3/1986 | (GB) . |
| 2 278 180 | * | 11/1994 | (GB) . |
| 8-72561 | * | 3/1996 | (JP) . |
| 2510914 | * | 4/1996 | (JP) . |
| 2510915 | * | 4/1996 | (JP) . |
| 8-177958 | * | 7/1996 | (JP) . |
| 61-191543 | * | 11/1996 | (JP) . |
| 9-42374 | * | 2/1997 | (JP) . |

* cited by examiner

*Primary Examiner*—Chris Schwartz
(74) *Attorney, Agent, or Firm*—Burr & Brown

(57) ABSTRACT

An active vibration damping system for damping vibration of a subject member, comprising: a fluid-filled vibration damping device having an elastic body partially defining a primary fluid chamber filled with a non-compressible fluid whose pressure is variable with the elastic deformation of the elastic body, an oscillating plate partially defining an auxiliary fluid chamber filled with the non-compressible fluid whose pressure is variable with the oscillation of the oscillating plate, and a drive means for generating a driving force for oscillating the oscillating plate; and a control device applying an electric drive pulse signal to the drive means and having a pulse signal generator for generating a control pulse signal whose frequency corresponds to that of the subject member's vibration, a phase modulator for modulating a phase of the control pulse signal depending upon a condition of the subject member's vibration, and a driving force regulator for adjusting a waveform of the control pulse signal to obtain the electric drive pulse signal, so that the driving force generated by the drive means corresponds to an amplitude of the subject member's vibration. The drive means generates the driving force whose magnitude corresponds to an amplitude of the electric drive pulse signal.

16 Claims, 10 Drawing Sheets

ACTIVE VIBRATION DAMPING SYSTEM HAVING CONTROLLER FOR GENERATING PULSE SIGNAL FOR OSCILLATION OF OSCILLATING PLATE PARTIALLY DEFINING FLUID CHAMBERS

The present application is based on Japanese Patent Application Nos. 9-335843 and 10-74015 filed on Dec. 5, 1997 and Mar. 23, 1998, respectively, the contents of which are incorporated hereinto by reference.

BACKGROUND OF THE INVENTION

1. Field of the Invention

The present invention relates to an active vibration damping system including a vibration damping device having a fluid chamber filled with a non-compressible fluid and mounted on a subject member whose vibration is damped by the damping system, and a control device for controlling the pressure of the fluid within the fluid chamber, so as to positively damp or isolate the input vibration. In particular, the present invention relates to such an active vibration damping system suitably used as an engine mount or any other type of vibration damper for an automotive vehicle.

2. Discussion of the Related Art

For damping or isolating a vibration (including a noise induced by the vibration) of a subject member such as a body of an automotive vehicle, there have been employed: a vibration damping device such as an engine mount or a suspension bushing, which is interposed between the subject member and a vibration source such as a power unit so as to connect these two members in a vibration damping fashion for eliminating or reducing a vibration transmitted from the vibration source to the subject member; and a vibration damper such as a dynamic damper which is fixed to the subject member for absorbing or reducing the vibration of the subject member. As one type of such a vibration damper, there are known active vibration damping systems as disclosed in laid-open publication No. 61-191543 of Japanese Utility Model application, Japanese Patent No. 2510914 and Japanese Patent No. 2510915, which have been developed so as to meet a recent requirement for improved vibration damping characteristics. Such an active vibration damping system includes: a vibration damping device having a fluid chamber filled with a non-compressive fluid and partially defined by an elastic body which is elastically deformable upon application of an input vibrational load from the subject member to the vibration damping device, the fluid chamber being further defined by an oscillating plate which is displaced or oscillated by a suitable drive means; and a control device for applying an electric drive signal to drive means for controlling the oscillation of the oscillating plate. The electric drive signal corresponds to the vibration to be damped by the damping system. The oscillation of the oscillating plate causes a periodic change of the pressure of the fluid within the fluid chamber, so as to positively isolate or damp the vibration of the subject member.

For obtaining an excellent vibration damping effect of the vibration damping device constructed as described above, the waveform of an oscillating force to be applied to the oscillating plate or the waveform of a pressure change of the fluid in the fluid chamber is required to meet or suit the particular characteristics of the vibration of the subject member as much as possible. In this respect, there has been proposed an engine mount as disclosed in JP-A 8-72561 and JP-A 9-42374, which is interposed between an internal combustion engine (vibration source) and a body (subject member) of a vehicle. In this engine mount, the control device generates the electric drive signal in the form of a sine wave drive current whose period, amplitude and phase correspond to those of the vibration. The generated drive signal is applied to the drive means such as an electromagnetic drive means or actuator to thereby oscillate the oscillating plate.

However, the control device adapted to generate the sine wave drive current whose waveform corresponds to the waveform of the vibration of the subject member tends to be complicated, inevitably resulting in an increase in the manufacturing cost of the damping device. Further, the complicated control device tends to suffer from generation of a high-frequency noise superimposed on the electric drive signal. More specifically described, the sine wave drive current which has a predetermined relationship with the characteristics of the vibration to be damped is preferably obtained according to an analog control or a pulse duration (width) modulation (PWM) control, for example. According to the analog control, there is initially obtained an analog base voltage signal having a sine waveform which corresponds to that of the vibration of the subject member. The sine wave base voltage signal is modified in the terms of its phase and amplitude (gain) by an analog processing circuit, to thereby obtain the desired sine wave drive current. According to the PWM control, on the other hand, there is initially obtained a digital base voltage pulse signal, which is then subjected to pulse width modulation according to or depending upon the waveform of the vibration of the subject member. The thus obtained digital base voltage pulse signal is applied to the drive means via an H-bridge circuit having switching elements such as transistor. The H-bridge circuit is adapted to control the application of the base voltage signal so as to obtain the desired sine wave drive current to be applied to the drive means. In the former case, i.e., in the case of the analog control, however, a very complicated electric circuit is required for generating the analog base voltage signal having a sine waveform, and for adjusting the phase and the amplitude (gain) of the base voltage signal, inevitably resulting in an increase of the manufacturing cost. On the other hand, the PWM control requires a carrier wave having a considerably high frequency, a central processing unit (CPU) having a large processing capacity e.g., 16–32 bits, for high-speed arithmetic operations to process the base voltage pulse signal at a high frequency, and a memory having a relatively large storage capacity for storing complicated control programs. Thus, the PWM control also inevitably suffers from an increase in the cost of manufacture.

Further, the active vibration damping system as described above is required to a relatively large oscillating force for oscillating the oscillating plate so as to provide an excellent active vibration damping effect. When the vibration of the subject member has a relatively large amplitude, the required oscillating force is accordingly large, requiring a large-sized drive means for oscillating the oscillating plate, resulting in an increase in the size and weight of the vibration damping device, and an increase in the required electric power consumption.

SUMMARY OF THE INVENTION

It is therefore a first object of the present invention to provide an active vibration damping system which is capable of exhibiting a high vibration damping effect with respect to a vibration of an subject member to be damped, and which includes a control device for generating an electric drive signal, which control device is simple in construction and available at a relatively low cost.

It is a second object of this invention to provide an active vibration damping system which is capable of eliminating or reducing the conventionally encountered problem of deterioration of its vibration damping characteristics with respect to a high-frequency vibration, due to higher harmonics of the electric drive signal i.e., a high-frequency noise superimposed on the drive signal, without requiring an electric signal processor which is complicated in construction.

It is a third object of this invention to provide an active vibration damping system which is capable of exhibiting a sufficiently high active damping effect, without an increase in the size of the drive means and in the required amount of consumption of electric power.

The above objects of the present invention may be achieved according to the principle of the invention, which provides an active vibration damping system for damping vibration of a subject member, comprising: a fluid-filled vibration damping device including an elastic body partially defining a primary fluid chamber filled with a non-compressible fluid, the elastic body being elastically deformed so as to cause a change in a pressure of the fluid in the primary fluid chamber, upon application of a vibrational load from the subject member, an oscillating plate partially defining an auxiliary fluid chamber filled with the non-compressible fluid, a drive means for generating a driving force for oscillating the oscillating plate so as to cause a change in a pressure of the fluid in the auxiliary fluid chamber, and an orifice passage for fluid communication between the primary and auxiliary fluid chambers; and a control device applying an electric drive pulse signal (E) to the drive means for controlling oscillation of the oscillating plate, the control device including a pulse signal generator for generating a control pulse signal (P) whose frequency corresponds to that of the vibration of the subject member, a phase modulator for modulating a phase of the control pulse signal depending upon a condition (S) of the vibration of the subject member, and a driving force regulator for adjusting a waveform of the control pulse signal to obtain the electric drive pulse signal (E) so that the driving force generated by the drive means corresponds to an amplitude of the vibration of the subject member, the drive means generating the driving force such that the driving force corresponds to an amplitude (G) of said electric drive pulse signal applied to the drive means.

In the active vibration damping system of the present invention constricted as described above, the electric drive pulse signal whose frequency corresponds to the vibration frequency of the subject member is directly applied to the drive means of the vibration damping device. The oscillating plate is oscillated by the driving means at a frequency corresponding to that of the electric drive pulse signal, to cause a periodic change of the pressure of the fluid in the auxiliary fluid chamber at the same frequency. The fluid within the auxiliary fluid chamber is forced to flow through the orifice passage to the primary fluid chamber due to a pressure difference of the fluid between these two chambers, whereby the fluid pressure change induced in the auxiliary fluid chamber is transmitted to the primary fluid chamber through the orifice passage. The fluid pressure change induced in the primary fluid chamber exhibits an active damping effect with respect to the vibration of the subject.

The orifice passage of the vibration damping device has a natural or resonance frequency which is determined by its length and cross sectional area, a density and viscosity of the fluid, a spring stiffness value of each of the primary and auxiliary chambers, and the like. Upon application of the vibration whose frequency is within a resonance frequency band to which the orifice passage is tuned, an amount of flow of the fluid through the orifice passage is sufficiently large owing to the resonance of the fluid. Upon application of the vibration whose frequency is outside the resonance frequency band, particularly, higher than the upper limit of the resonance frequency band, a resistance to flow of the fluid through the orifice passage is remarkably high. The active vibration damping effect is induced by the periodic fluid pressure change in the primary fluid chamber by the oscillation of the oscillating plate. The fluid pressure change in the primary fluid chamber is not caused directly by the oscillation of the oscillating plate. Namely, the fluid pressure change in the auxiliary fluid chamber is caused directly by the oscillation of the oscillating plate. This pressure change in the auxiliary fluid chamber is transmitted to the primary fluid chamber by the flow of the fluid through the first orifice passage.

Accordingly, the abrupt pressure change of the fluid in the auxiliary fluid chamber is moderated due to the resistance to flow of the fluid through the orifice passage into the primary fluid chamber. That is, the orifice passage of the vibration damping device of the present invention functions to increase the rise and fall times of the waveform of the periodic pressure change of the fluid within the primary fluid chamber, so that the waveform of the fluid pressure change in the primary fluid chamber similar to that of the sine wave, even though the drive signal applied to the drive means is a pulse signal. Thus, the vibration damping device provides an active vibration damping force whose waveform is similar to that of the vibration of the subject member, resulting in an excellent active damping effect with respect to the vibration of the subject member.

Moreover, the vibration damping system constructed according to the present invention has the driving force regulator which is adapted to adjust the waveform of the control pulse signal generated by the pulse signal generator, to obtain the electric drive pulse signal, depending upon the amplitude of the vibration of the subject member, so that the drive means generates the driving force whose magnitude corresponds to the amplitude of the vibration of the subject member, resulting in a further improved active damping effect with high stability.

In the vibration damping system of the present invention, an amount of flow of the fluid through the orifice passage, in other words, the pressure transmitting efficiency of the orifice passage, is significantly reduced when the fluid pressure change in the auxiliary fluid chamber occurs at a frequency higher than the resonance frequency of the orifice passage. That is, the orifice passage functions as a filter which permits the fluid pressure change at a frequency equal to or lower than its resonance frequency band, but restricts the fluid pressure change at a frequency higher than the resonance frequency band. With the resonance frequency of the orifice passage tuned to the desired frequency band, a high-frequency noise which is induced in the auxiliary fluid chamber due to the higher harmonics of the electric drive pulse signal and which is transmitted to the primary fluid chamber can be effectively reduced, without any specific operation for processing the electric drive pulse signal. Thus, the active vibration damping system of the present invention is free from or less likely to suffer from the conventionally experienced problem of deterioration of the active vibration damping effect with respect to the high-frequency band.

When the fluid pressure in the auxiliary fluid chamber changes at a frequency within the resonance frequency band of the orifice passage, the amount of flow of the fluid through the orifice passage is comparatively large, owing to the resonance of the fluid, and the absolute value of the complex spring constant of the vibration damping device is accordingly reduced. As a result, the pressure change in the auxiliary fluid chamber transmitted to the primary fluid chamber is amplified with the increase of the amount of flow of the fluid through the orifice passage, whereby the pressure change in the auxiliary fluid chamber is transmitted to the primary fluid chamber with high efficiency. Thus, the orifice passage which is tuned to the desired frequency band permits the vibration damping device to exhibit a sufficiently high active damping effect with respect to the vibration whose frequency is within the tuned band, while making it possible to reduce the required size and weight of the control device and the vibration damping device, and the required amount of electric power consumption.

Further, the active vibration damping system of the present invention uses a pulse signal as the electric drive signal whose frequency corresponds to that of the vibration of the subject member. This arrangement eliminates the conventional need for a complicated electric circuit for generating the sine-wave current signal used in the analog control, and the conventional need for a central processing unit having a large processing capacity for processing high-frequency signals used in the PWM control. This arrangement makes it possible to reduce the required processing capacity of the central processing unit in the present vibration damping system, permitting the use of the control device which is simple in construction and economical to manufacture.

It is noted that the present vibration damping device may be used as a vibration damping mount such as an engine mount or a body mount, which is interposed between two members of a vibration system, i.e., a vibration transmitting member or a vibration source and a subject member whose vibration is damped by the mount, for connecting these two members in a vibration damping fashion or for mounting one of the two members on the other member in a vibration damping fashion. Alternatively, the present vibration damping device may be used as a vibration damper which is fixed to the subject member so as to positively isolate or damp the vibration of the subject member.

The electrically operated drive means for oscillating the oscillating plate is preferably a drive means which have a linear input-output relationship. For instance, it is preferable to employ an electromagnetic drive means of voice-coil type or solenoid type, or a drive means using strictive elements such as electrostrictive or magnetostrictive elements. However, it is possible to use a fluid-actuated drive means adapted to generate a driving force based on a fluid pressure such as an air or an oil pressure which is regulated by an electrically controlled servo value or other value.

The pulse signal generator may be constructed depending upon the characteristics of the vibration of the subject member or the kind of the vibration sources. The pulse signal generator may be an electric or mechanical device which generates a the control pulse signal having a frequency corresponding to that of the vibration of the subject member. In this respect, the frequency of the generated control pulse signal is merely required to correspond to the frequency of the vibration of the subject member, and may be equal to, two or more times, or a half or more of the frequency of the vibration of the subject member, for example. Further, the control pulse signal generated by the pulse signal generator is simply required to be synchronized with the vibration to be damped, and is not necessarily required to have the phase as the vibration to be damped.

The phase modulator may be a computer operated according to a suitable control program, so as to modulate or control the phase of the control pulse signal so that the phase of the electric drive pulse signal which is obtained from the control pulse signal and is applied to the drive means permits the vibration damping device to exhibit a sufficient active damping effect with respect to the vibration of the subject member.

As the electric drive pulse signal, it is possible to employ a current signal in the form of a digital ON/OFF pulse signal having a single polarity or opposite polarities. In the latter case, the drive means is adapted to generate the driving force in the opposite directions corresponding to the opposite polarities of the drive pulse signal, to oscillate the oscillating plate in the opposite directions. In the former case, the drive means is adapted to generate the driving force in only one direction to displace the oscillating plate in only one direction each time the drive pulse signal is generated. In this case, some means is required to restore the oscillating plate to its original position.

The driving force regulator of the active vibration damping system of the present invention may be constituted by any means which is capable of adjusting the waveform of the control pulse signal so as to obtain the electric drive pulse signal to be applied to the drive means so that the drive means generates the driving force to provide a sufficient active vibration damping effect with respect to the vibration of the subject member. For instance, the driving force regulator is adapted to adjust the number of pulses, a rise time or a fall time of the control pulse signal as generated by the pulse signal generator. Since the driving force regulator controls the control pulse signal to obtain the electric drive pulse signal for actuating the drive means, the driving force regulator may be considered to control the electric drive pulse signal.

According to one preferred form of the present invention, the driving force regulator comprises a gain controller for adjusting an amplitude of the control pulse signal according to the amplitude of the vibration of the subject member.

The driving force regulator comprising the gain controller permits an effective adjustment of the waveform of the control pulse signal, as explained below. Namely, the control pulse signal generated by the pulse signal generator is amplified with an amplifier having a switching means such as a field-effect transistor or other transistor, :for example. The source voltage of the amplifier is regulated according to the amplitude of the vibration of the subject member, so that the amplitude of the control pulse signal is accordingly regulated. While the source voltage can be regulated by using a known voltage regulating device, it is preferable to regulate the source voltage by pulse width modulation (PWM), which may be executed by a simple electric circuit with high accuracy. Even when the source voltage regulation is executed by the PWM control, the source voltage regulation can be executed based on the period of an electric drive signal corresponding to the frequency of the vibration of the subject member, i.e., based on the period of the control pulse signal generated by the pulse signal generator. In this case, the drive means does not require a central processing unit having a large processing capacity.

In the above preferred form of the invention, the gain controller includes a stabilized power supply as a power source.

This stabilized power supply assures that the voltage of the control pulse signal, that is, the driving force to oscillate the oscillating plate accurately corresponds to the amplitude of the vibration of the subject member, enabling the vibration damping system to exhibit a further improved vibration damping effect.

According to another preferred form of the present invention, the driving force regulator comprises a duty ratio controller for adjusting a duty ratio of the control pulse signal according to the amplitude of the vibration of the subject member.

The driving force regulator comprising the duty ratio controller is capable of adjusting the duty ratio of the control pulse signal according to the amplitude of the vibration of the subject member. The duty ratio controller preferably includes a microcomputer operable to execute an appropriate control program. The duty ratio used herein means a ratio of a pulse duration time Td to a pulse spacing Tp of each pulse wave of the electric control pulse signal.

In a further preferred form of the present invention, the driving force regulator comprises a duty ratio limiter for limiting the duty ratio of the electric drive pulse signal to within a range of 40%–60%, preferably to 50%.

In this arrangement, each pulse wave of the control pulse signal, that is, the electric drive pulse signal is regulated such that the pulse duration time (ON time) Td is substantially equal to the pulse separation time (OFF time) Ts. The thus regulated electric drive pulse signal is effective to reduce an adverse effect or influence due to the higher harmonics of the electric drive pulse signal, namely, effective to reduce an undesirable periodic fluid pressure change in the primary fluid chamber due to the high harmonics, thereby preventing deterioration of the active damping effect with respect to the high-frequency vibration. The regulated electric drive pulse signal is also effective to permit the periodic fluid pressure change in the primary fluid chamber to have the sinusoidal waveform, leading to a further improved active damping effect with respect to the vibration of the subject member.

The duty ratio limiter may be usable with the gain controller or the duty ratio controller. The duty ratio limiter is also useable together with both of the gain controller and the duty ratio controller. In this case, the waveform of each pulse of the control pulse signal is regulated by the duty ratio controller by adjusting the duty ratio of the control pulse signal, if the duty ratio within a range of 40%–60% permits the driving force to correspond to the amplitude of the vibration of the subject member, and is regulated by the gain controller and the duty ratio limiter by adjusting the amplitude of the control pulse signal while maintaining the duty ratio with the above-indicated range, if the duty ratio within the above-indicated range does not permit the driving force to correspond to the amplitude of the vibration of the subject member.

According to a still-further preferred form of the present invention, the oscillating plate which is movably disposed in the vibration damping device so as to periodically change the fluid pressure in the auxiliary fluid chamber, is elastically supported by an elastic support which is elastically deformable or displaceable so as to permit displacement or oscillation of the oscillating plate. In this case, the elasticity of the elastic support assures smooth oscillation of the oscillating plate and therefore smooth periodic changes of the fluid pressures in the primary and auxiliary fluid chambers, whereby the waveform of those periodic pressure changes are made similar to the waveform of the vibration of the subject member, i.e., the sinusoidal waveform, so as to exhibit a desired active damping effect with respect to the vibration of the subject member.

In the above preferred form of the damping system, the elastic support partially defines the auxiliary fluid chamber.

In this case, the elasticity of the elastic support functions to smooth the periodic fluid pressure change of the auxiliary fluid chamber.

In addition, the oscillating plate can be restored by the elasticity of the elastic support to its original position with high stability, when the driving force applied by the driving means to the oscillating plate has been removed or zeroed. The use of the elastic support having a relatively simple structure is effective to improve the control accuracy of the fluid control accuracy of the fluid pressures in the primary and auxiliary fluid chambers, and to thereby improve the control accuracy of the active vibration damping effect. For instance, the elastic support member is useful where the oscillating plate is moved by the drive means in a predetermined direction upon application of the electric drive pulse signal in the form of an ON/OFF current signal, irrespective of the polarity of the electric current signal. In this case, the elastic support effectively improves the control accuracy of the oscillation of the oscillating plate and the fluid pressure change in the primary and auxiliary chambers.

A function similar to the above indicated function of the elastic support of the present damping device may be achieved by a suitable electric circuit of the control device. For instance, a power supply circuit for applying the electric drive pulse signal to the drive means may be arranged to incorporate a lag module such as differentiating and integrating elements, so as to electrically delay the rise and fall times of the drive pulse signal. The use of the lag module is effective to permit the vibration damping device to provide the active damping waveform similar to the waveform of the vibration of the subject matter. This lag module can be employed in combination with the elastic support member.

According to a still further preferred embodiment of the present invention, the damping device further comprises an flexible diaphragm elastically deformable and partially defining an equilibrium fluid chamber, and a second orifice passage for fluid communication between the equilibrium fluid chamber and one of the primary and auxiliary fluid chambers, the second orifice passage being tuned to a frequency band lower than the frequency band to which the first orifice passage is tuned.

The use of the equilibrium fluid chamber and the second orifice passage is effective to absorb or accommodate an increase in the fluid pressure in the primary fluid chamber, with an increase in volume of the equilibrium chamber, when the primary fluid chamber receives a static load upon installation of the vibration damping device. Where the vibrtion damping device is used to elastically mount a power unit on the body of a motor vehicle, the weight of the power unit acts on the vibration damping device as the static load. Thus, the equilibrium fluid chamber assures adequate control of the fluid pressure in the primary and auxiliary fluid chambers, for permitting the vibration damping device to provide a desired active vibration damping effect with high stability. The use of the second orifice member is effective to improve the active vibration damping effect of the vibration damping device, owing to the resonance of the fluid flowing through the second orifice member. It is noted that the above-mentioned filter function of the first orifice passage tends to be deteriorated with respect to the vibration whose frequency is lower than the frequency band to which the first orifice is tuned. However, the resonance frequency of the fluid flowing through the second orifice passage is tuned to the frequency band to which the first orifice passage is tuned, whereby the vibration damping device can exhibit a sufficient active damping effect with respect to the low-frequency vibrations. Within the frequency band to which the first orifice passage is tuned, a resistance to flow of the fluid through the second orifice passage is significantly high, resulting in substantially no flow of the fluid through the second orifice passage, assuring the desired damping effect of the vibration damping device owing to the resonance of the fluid flowing through the first orifice passage, without any influence of the second orifice passage.

According to a yet further preferred embodiment of the present invention, the present vibration device further comprises a first and a second mounting member which are spaced apart from each other and are connected to each other by the elastic body interposed therebetween, and a partition member supported by the second mounting member and separating the primary and secondary fluid chambers from each other such that the primary fluid chamber located on one of opposite sides of the partition member while the auxiliary fluid chamber is located on the other side of the partition member, the second mounting member supporting the drive means, one of the first and second mounting member being fixed to the subject member whose vibration is damped by the vibration damping system. Although the vibration damping device of the present vibration damping system is not limited to any specific construction, the above-indicated construction is effective to arrange the primary and auxiliary fluid chambers and the other members with high-space utilization, and to make the vibration damping device compact.

The vibration damping system constructed according to the present invention may be used as a vibration damping mount for an automotive vehicle such as an engine mount or a body mount, and may also be used as various kinds of damping device other than those used on the vehicle. Preferably, the present vibration damping system is installed in a vibration system including an internal combustion engine as a vibration source, so that the vibration of the engine is damped or isolated.

In yet another preferred form of the present invention, the subject member is connected through the vibration damping device to an internal combustion engine in vibration damping fashion, and the pulse signal generator of the control device generates the control pulse signal corresponding to a cranking angle of the internal combustion engine. Namely, the internal combustion engine generates a vibration whose period corresponds to its operating speed, so that the electric drive pulse signal obtained based on the control pulse signal also corresponds to the operating speed of the engine. This arrangement permits the vibration damping device to provide the active damping waveform corresponding to the operating speed of the engine, resulting in an excellent active vibration damping effect of the vibration damping device.

In yet another preferred form of the present invention, the subject member is connected through the vibration damping device to an internal combustion engine in a vibration damping fashion, and the pulse wave generator of the control device generates said control pulse signal corresponding to an ignition timing of the internal combustion engine.

The pulse signal generator may be constituted by one of various kinds of sensors of magnetic type, electric type and optical type which are capable of detecting the ignition timing or a clanking angle of the engine, for example.

According to a still further preferred form of the present invention, a frequency "f" of oscillation of the oscillating plate and a frequency "F" to which the first orifice passage is tuned so as to exhibit a relatively low absolute value of complex spring constant of the damping device are determined so as to satisfy a relationship represented by the following formula: $3F/4 \leq f \leq 3F$. More preferably, the frequency "F" is within a range of ±5 Hz of the vibration frequency to be damped. The frequency "F" means a frequency to which the vibration damping device exhibits a minimum peak value of the absolute value of its complex spring constant owing to the flow of the fluid through the first orifice passage. The orifice passage which is tuned as described above, effectively exhibits the filtering effect and the amplifying effect, resulting in a further improved active vibration damping effect of the vibration damping device.

According to still another preferred form of the present invention, the control device further comprises a memory means for storing a first data map representing a predetermined first relationship between different phases of the control pulse signal (P) determined by the phase modulator and respective different conditions (S) of the vibration of the subject member, and a second data map representing a predetermined second relationship between different waveforms of the electric drive pulse signal (E) obtained by the drive force regulator and respective different values of the amplitude of the subject member, wherein the phase modulator determines the phase of the control pulse signal according to the predetermined first relationship and based on a first monitoring signal (S) indication the condition of the vibration of the subject member, and the driving force regulator determines the waveform of the electric drive pulse signal according to the predetermined second relationship and based on a second monitoring signal (S) indicating second amplitude of the vibration of the subject member.

The use of the control device constructed according to the above preferred form, makes it possible to control the driving force of the drive means in an open-loop fashion, to facilitate the control operations, to reduce the required processing time and to improve a control response of the control device, thereby improving the active vibration damping effect of the vibration damping device.

In the above preferred form of the present invention, the subject member is a part of an automotive vehicle, and the first and second monitoring signals are selected from amount signals indicating: an operating speed of an engine of the vehicle; a shift lever position of the vehicle; a running speed of the vehicle; a throttle opening angle of the vehicle; a water temperature of the engine; an oil temperature of the vehicle; and a temperature of the elastic body.

In the present vibration damping system, the control device does not necessarily controls the electric drive pulse signal using the above-indicated data maps. For instance, the control device may be adapted to effect a feed-back control. In this case, the control device may use a vibration sensor, such as a vibration acceleration sensor, a displacement sensor or a load sensor for detecting the amplitude of the vibration of the subject member. The output of the vibration sensor represents an error that should be zeroed by the feedback control. Namely, the electric drive pulse signal is modulated in terms of its phase and waveform, so as to zero the output of the vibration sensor. The above-described control using the data maps may be performed in a feed-back fashion such that the predetermined values of the phase and waveform of the data maps stored in memory means, are updated at a suitable time interval so as to achieve a learning control. In the above-indicated feed back control, the phase and amplitude of the electric drive pulse signal may be adjusted in an adaptive control mode.

BRIEF DESCRIPTION OF THE DRAWINGS

The above and optional objects, features, advantages and technical and industrial significance of this invention will be better understood by reading the following detailed description of presently preferred embodiments or modes of the invention, when considered in connection with the accompanying drawings, in which.

DETAILED DESCRIPTION OF THE PREFERRED EMBODIMENTS

Figure 1:
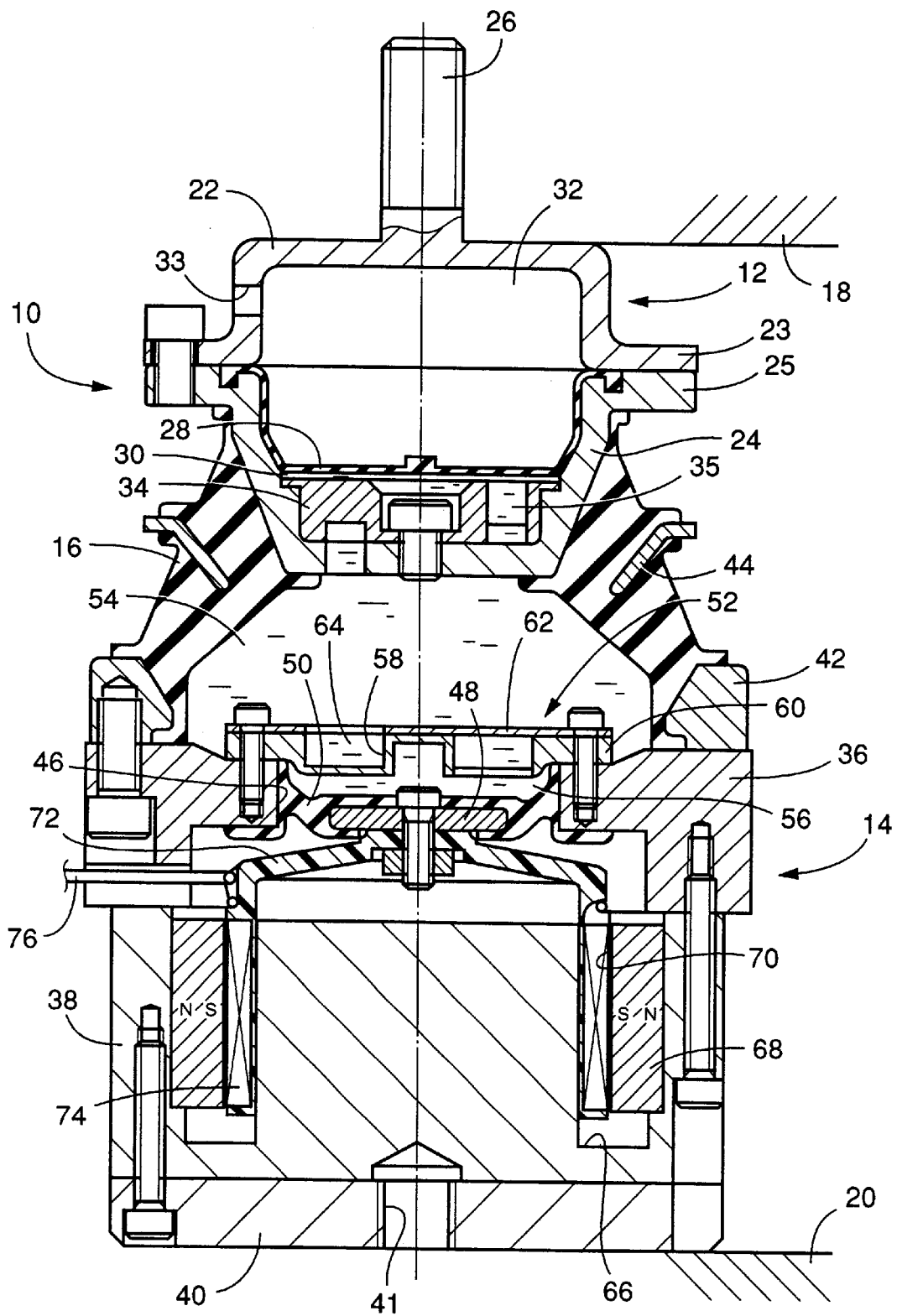
FIG. 1 is an elevational view in axial or vertical cross section of a fluid-filled vibration damping device of an active vibration damping system in the form of an engine mount constructed according to a first embodiment of this invention.

Referring first to FIG. 1, there is shown a fluid filled vibration damping device in the form of an engine mount 10, which constitutes a part of an active vibration damping system for an automotive vehicle, which is constructed according to a first embodiment of this invention. This engine mount 10 includes a first mounting member 12 and a second mounting member 14 which are both made of metallic materials and which are disposed in mutually opposed and spaced-apart relationship with each other. The first and second mounting members 12, 14 are elastically connected with each other by an elastic body 16 made of a rubber material interposed therebetween, and are attached to a power unit 18 and a body 20 of the automotive vehicle, respectively, so that the power unit 18 is mounted on the body 20 in a vibration damping fashion. With this engine mount 10 installed on the vehicle as described above, the elastic body 16 is held elastically compressed with the weight of the power unit 18 acting on the engine mount 10, such that the first and second mounting members 12i 14 are moved toward each other by a predetermined distance from their positions before the installation of the engine mount 10. The engine mount 10 is installed so as to damp primarily input vibrations which are applied in the direction in which the two mounting members 12, 14 are opposed to and spaced apart from each other, namely in the vertical direction as seen in FIG. 1.

Described more specifically, the first mounting member 12 includes an upper metal member 22 and a lower metal member 24 which are both cup-shaped members having respective outward flanges 23, 25 at their open ends. The upper and lower metal members 22, 24 are fluid-tightly superposed on each other at their outward flanges 23, 25 and bolted together, so as to constitute a hollow structure. The upper metal member 22 has a mounting bolt 26 secured to its bottom wall so as to extend in the upward direction. The first mounting member 12 is fixed with the mounting bolt 26 to the power unit 18.

Within the hollow structure of the first mounting member 12, there is accommodated a relatively thin, circular flexible diaphragm 28 which is made of a rubber material and is easily deformable, such that an outer peripheral portion of the flexible diaphragm 28 is gripped by and between the outer fringes 23, 25 of the upper and lower metal members 22, 24, so that the flexible diaphragm 28 fluid-tightly divides the space within the hollow structure of the first mounting member 12 into an upper and lower section. The lower section defined by the flexible diaphragm 28 and the lower metal member 24 provides an equilibrium fluid chamber 30 which is filled with a non-compressible fluid and the volume of which is variable based on elastic deformation of the flexible diaphragm 28. The upper section defined by the flexible diaphragm 28 and the upper metal member 22 provides an air chamber 32 which is exposed to the atmosphere through a hole 33 formed through the upper metal member 22, so as to permit a displacement of the flexible diaphragm 28. The non-compressible fluid filling the equilibrium fluid chamber 30 may be selected from a low-viscosity fluid such as water, alkylene glycol, polyalkylene glycol, silicone oil, preferably from a low-viscosity fluid whose viscosity is 0.1 Pa.s or lower, so that the engine mount 10 exhibits an excellent vibration damping effect on the basis of the resonance of the fluid.

The first mounting member 12 further accommodates in its hollow structure an orifice defining member 34 having a circular disk shape and made of a metallic material, such that the orifice defining member 34 is superposed on and bolted to the bottom wall of the lower metal member 24. The orifice defining member 34 and the bottom wall of the lower metal member 24 cooperate with each other to define therebetween a fluid communication passage 35 which extends in the circumferential direction of the orifice defining member 34 and has a circumferential length slightly smaller than the circumference of the member 34. One of opposite ends of the fluid communication passage 35 is open to the equilibrium chamber 30, while the other end of the fluid communication passage 35 is open in the outer surface of the bottom wall of the lower metal member 24.

On the other hand, the second mounting member 14 includes a cylindrical support member 36, a cylindrical yoke member 38 and a circular disk-shaped bottom member 40, which are made of metallic materials. These members 36, 38, 40 are superposed on one another in the axial or vertical direction and bolted together, so as to constitute a generally disk like structure having a relatively large thickness or axial dimension. The bottom member 40 has a tapped hole 41 formed through its diametrically central area, so that the second mounting member 14 is fixed to the body 20 with a bolt screwed in the tapped hole 41.

The second mounting member 14 is disposed below the first mounting member 12 such that the second mounting member 14 is opposed to and spaced apart from the first mounting member 12 in the axial direction, with a predetermined axial or vertical spacing distance therebetween. The elastic body 16 is interposed between the two mounting members 12, 14 for elastic connection therebetween.

The elastic body 16 has a hollow frusto-conical shape with a relatively large wall thickness. The lower metal member 24 and a connecting ring 42 are bonded to the small-diameter and large-diameter open ends of the elastic body 16, respectively, in the process of vulcanization of a rubber material to form the elastic body 16. The connecting ring 42 is superposed on the upper surface of the cylindrical support member 36 of the second mounting member 14, a nd bolted to the support member 36, whereby the elastic body 16 is secured at its large-diameter open end to the second mounting member 14. With the first and second mounting members 12, 14 elastically connected to each other with the elastic body 16 interposed therebetween, there is provided an interior space of the engine mount 10 which is fluid-tightly enclosed, partially defined by the elastic body 16 and interposed between the first and second mounting members 12, 14. The elastic body 16 has a restricting ring 44 almost entirely embedded in an axially intermediate portion thereof. This restricting ring 44 is provided to prevent buckling of the elastic body 16, thereby improving the stability of the elastic deformation of the elastic body 16.

The cylindrical support member 36 has a center bore 46 which accommodates in its axially middle portion a circular disk-shaped oscillating plate 48 whose diameter is smaller than that of the center bore 46. This oscillating plate 48 is made of a rigid material such as a metallic material or a synthetic resin material. The outer peripheral portion of the oscillating plate 48 is diametrically opposed to and spaced apart from the inner circumferential surface of the cylindrical support member 36 (center bore 46) with a suitable radial spacing distance. Between the outer peripheral portion of the oscillating plate 48 and the inner circumferential surface of the support member 36, there is disposed an annular elastic support 50 such that the annular elastic support 50 is secured by vulcanization at its inner and outer peripheral portions to the outer peripheral portion of the oscillating plate 48 and the inner circumferential surface of the support member 36, respectively. Accordingly, the oscillating plate 48 is elastically supported by the second mounting member 14 via the annular elastic support 50. The oscillating plate 48 and the annular elastic support 50 fluid-tightly close one of opposite open ends of the center bore 46, which is remote from the elastic body 16. The elasticity of the elastic support 50 permits the oscillating plate to be easily oscillated or displaced in the vertical direction. With no external or vibrational load applied to the engine mount 10, the oscillating plate 48 is held in its original position with the elasticity of the elastic support 50 in which an internal stress of the elastic support member 50 is substantially zero.

Above the oscillating plate 48, there is disposed a partition member 52 in the form of a circular disk having a relatively large wall thickness and extending in the radial direction of the engine mount 10. The partition member 52 is superposed on and bolted to the support member 36 of the second mounting member 14, at its radially outer portion. This partition member 52 fluid-tightly closes the other open end of the center bore 46 of the support member 36, and fluid-tightly divides the interior space of the engine mount 10, into an upper part and a lower part. The partition member 52 cooperates with the elastic body 16 to define the above-indicated upper part of the space, which functions as a primary fluid chamber 54 filled with the non-compressible fluid. Upon application of a vibrational load between the first and second mounting members 12, 14, the elastic body 16 is elastically deformed in an oscillating manner thereby causing a periodic change of the pressure of the fluid within the primary fluid chamber 54. The partition member 52 cooperates with the oscillating plate 48 to define the above-indicated lower part of the space, which functions as an auxiliary fluid chamber 56 filled with the non-compressible fluid. The oscillating plate 48 is actuated so as to cause a periodic change in the pressure of the fluid within the auxiliary fluid chamber. That is, the partition member 52 separates the primary fluid chamber 54 and the auxiliary fluid chamber 56 from each other. The assembling of the elastic body 16 bonded to the first mounting member 12 and the connecting ring 42 is bolted at the ring 42 to the cylindrical support 36 accommodating the oscillating plate 48. This assembling is effected within a mass of the non-compressible fluid, for example, so that the primary and auxiliary fluid chambers 54, 56 and the equilibrium chamber 30 are filled with the fluid.

The partition member 52 consists of a lower partition plate 60 and an upper partition plate 62 which are both made of metallic materials and have a circular disk shape. The lower partition plate 60 has a relatively large wall thickness and is formed at its radially intermediate portion with a circumferential groove 58 which extends in its circumferential direction and is open in its upper surface. The upper partition plate 62 has a relatively small wall thickness and is superposed on and bolted to the upper surface of the lower partition plate 60 so as to close the opening of the circumferential groove 58, to thereby provide a first orifice passage 64 for fluid communication between the primary fluid chamber 54 and the auxiliary fluid chamber 56, which passage 64 extends within the partition member 52 and has a predetermined circumferential length. The primary chamber 54 is also held in communication with the equilibrium chamber 30 through the fluid communication passage 35 formed within the first mounting member 12. The resonance frequency of the fluid flowing through the fluid communication passage 35 is tuned to a frequency band which is lower than the frequency band to which the first orifice passage 64 is tuned. The resonance frequencies of the fluid flowing through the respective passages 35, 64 are suitably tuned, by adjusting the cross sectional areas of fluid communication and the lengths of the orifice passages 64, 35, in view of the desired spring stiffness values of the primary, auxiliary and equilibrium fluid chambers 54, 56, 30, and in view of the viscosity of the fluid used in the engine mount 10. The term "spring stiffness" used herein means an amount of change in the pressure of the fluid required to cause a change of the volume of each chamber 54, 56, 30 by a given amount. In the present embodiment, for example, the first orifice passage 64 is tuned so as to exhibit a low dynamic spring constant and an accordingly high vibration isolating effect with respect to vibrations having a frequency of about 20 Hz, such as an engine idling vibrations, based on the resonance of the fluid flowing therethrough, while the fluid communication passage 35 is tuned so as to exhibit a high damping effect with respect to vibrations having a frequency of about 10 Hz, such as an engine shake, on the basis of the resonance of the fluid flowing therethrough.

As is apparent from the foregoing description of the present embodiment, the primary, auxiliary and equilibrium fluid chambers 54, 56, 30 constitute a fluid chamber, and the orifice and fluid communication passages 64, 35 constitute a first and a second orifice passage, respectively.

The yoke member 38 of the second mounting member 14 is made of a ferromagnetic material such as an iron, and is formed with a circumferential groove 66 which has a rectangular shape in a vertical or axial cross section (as seen in FIG. 1) and extends in its circumferential direction. The circumferential groove 66 is open in its axial upper end face. In the circumferential groove 66, a cylindrical permanent magnet 68 is accommodated such that the outer circumferential surface of the permanent magnet 68 is bonded to the outer circumferential surface of the circumferential groove 66. The permanent magnet 68 may be a single cylindrical member or may consists of a plurality part-cylindrical members. This permanent magnet 68 has opposite magnetic poles at its inner and outer circumferential surfaces, so that the yoke member 38 provides a closed magnetic path or circuit. With the permanent magnet 68 thus fixed in the circumferential groove 66, there exists a given radial spacing between the inner circumferential surface of the circumferential groove 66 and the inner circumferential surface of the permanent magnet 68. This radial spacing gives a magnetic gap 70.

In the second mounting member 14, there is disposed a cup-shaped bobbin 72 such that the bottom portion of the bobbin 72 is superposed on and bolted to a radially central portion of the lower end face of the oscillating plate 48, while the cylindrical wall portion of the bobbin 72 is provided with a coil 74 and disposed within the magnetic gap 70 formed in the yoke member 38, with a slight radial spacing therebetween so that the coil 74 is axially or vertically displaceable. Upon application of an electric drive current to the coil 74 through a conductor wire 76, the coil 74 is subjected to an electromagnetic force (Lorentz force) in its axial direction produced by interaction of the applied electric drive current and a magnetic field in the magnetic gap 70, so that the coil 74 is moved with the bobbin 72. As a result, the oscillating plate 48 is displaced in its axial direction with the electromagnetic force applied via the bobbin 72 to the oscillating plate 48.

The oscillating plate 48 is oscillated in the vertical direction by alternately turning on and off a suitable switch for periodically applying an electric current to the coil 74, or by applying an alternating current to the coil 74, so as to cause a periodic change in the pressure of the fluid within auxiliary fluid chamber 56. Namely, the frequency and magnitude of fluid pressure change in the auxiliary fluid chamber 56 respectively correspond to the frequency and amplitude of oscillation of the oscillating plate 48. This periodic pressure change induced in the auxiliary fluid chamber 56 by the oscillation of the oscillating plate 48 causes a pressure difference of the fluid between the primary and auxiliary fluid chambers 54, 56, whereby the fluid is forced to flow between these chambers 54, 56 through the orifice passage 64. Thus, the pressure change in the auxiliary fluid chamber 56 is transmitted through the orifice passage 64 to the primary chamber 54, so that the engine mount 10 provides a vibration damping effect based on the periodic pressure change in the primary fluid chamber 54. That is, the engine mount 10 positively or actively exhibits a damping effect with respect to the input vibration transmitted from the power unit 18 to the body 20, by positively oscillating the oscillating plate 48 at the frequency and amplitude which correspond to those of the vibration of the body 20 to be damped by the engine mount 10.

Figure 2:
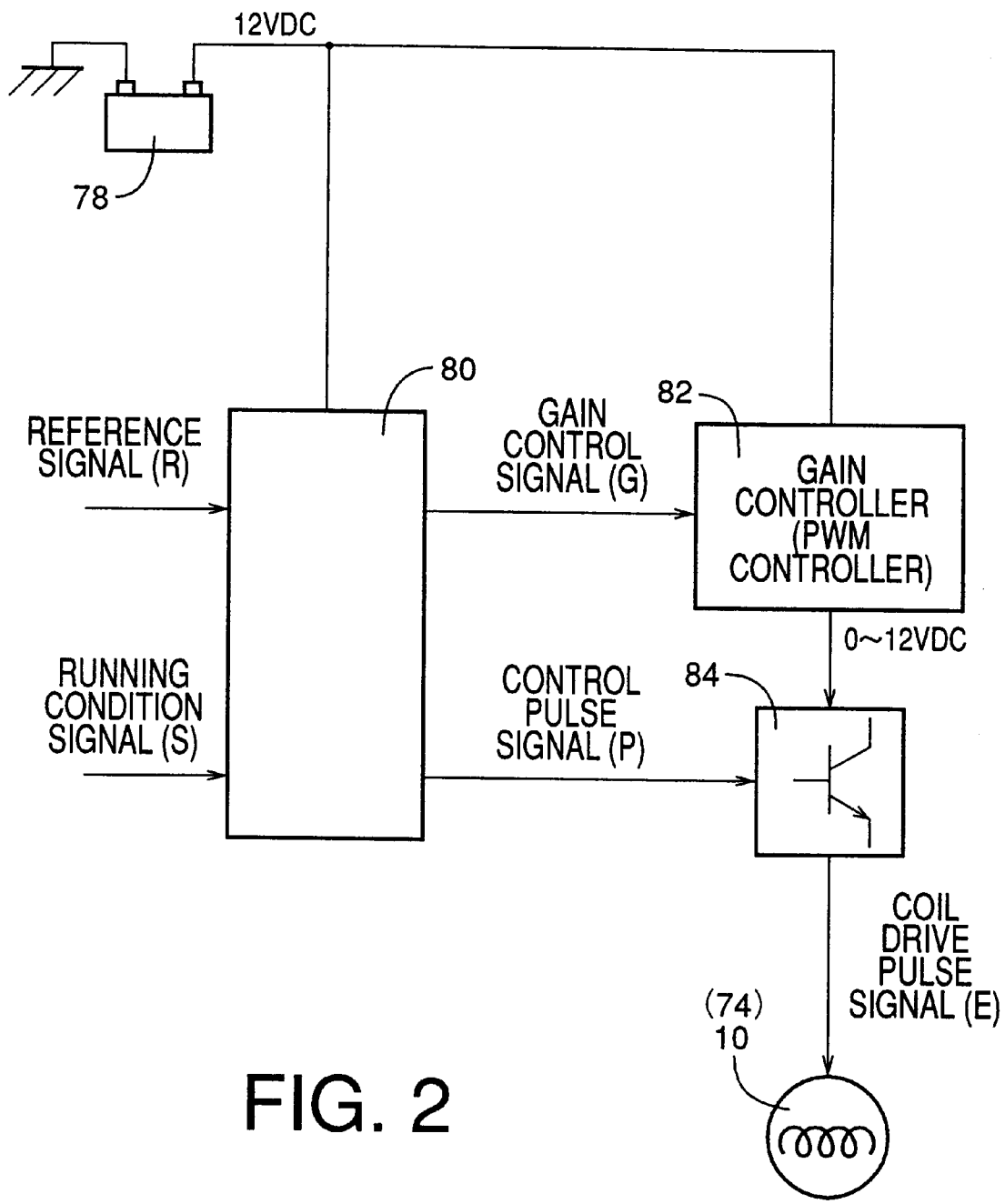
FIG. 2 is a block diagram schematically showing a control device of the active vibration damping system, which is constructed according to the first embodiment of this invention.

For enabling the engine mount 10 to exhibit a sufficient active vibration damping effect, the engine mount 10 is controlled so as to suitably control the oscillating force for oscillating the oscillating plate 48, depending upon the vibration to be damped. In this embodiment, the electric drive current applied to the coil 74 is suitably controlled by a control device which is schematically illustrated in FIG. 2.

This control device includes a controller 80 in the form of a microcomputer which is operable with a power source 78 such as a buttery. The controller 80 incorporates a central processing unit (CPU), a random-access memory (RAM) and a read-only memory (ROM) and an input/output interface circuit. The ROM stores various control programs and data. The controller 80, is adapted to receive a reference signal R which is used to generate a coil drive pulse signal E to be applied to the engine mount 10. The reference signal R desirably has a relatively high degree of correlationship with the characteristics of the vibration which is to be damped by the engine mount 10. In the present embodiment, the reference signal R is preferably obtained from an ignition pulse sensor or a crank angle sensor provided for the engine of the power unit 18. In particular, the ignition pulse signal is preferably employed as the reference signal R.

Figure 3:
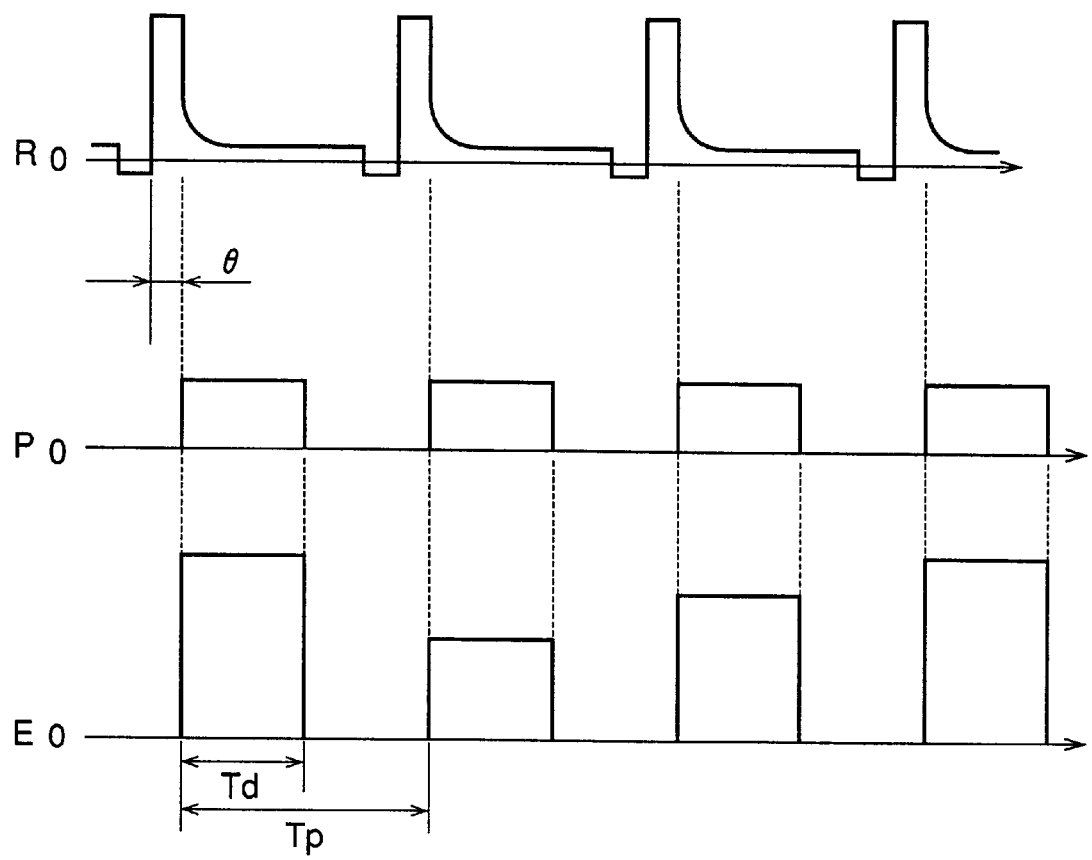
FIG. 3 is a graph showing waveforms of signals generated in or by the control device of FIG. 2.

The waveform of the reference signal R in the form of the engine ignition pulse signal is shaped as needed to as shown in FIG. 3, and before the reference signal is applied to the controller 80. The controller 80 generates a control pulse signal P which has the same frequency as the ignition pulse signal and a duty ratio of about 0.5 (50%). In the present embodiment, the controller 80 effectively functions as a pulse signal generator and a duty ratio limiter.

Further the controller 80 is also adapted to adjust a phase difference θ of the control pulse signal P with respect to the rise of the ignition pulse signal R, depending upon the running condition of the vehicle, so that the engine mount 10 exhibits a desired damping effect with respect to the vibration of the body 20. More specifically described, signals indicating a currently selected position of a transmission shift level and the running speed of the vehicle are applied to the controller 80 as a running condition signal S, which indicates the vehicle running condition, which in turn influences the vibration of the body 20. It is noted that the "vehicle running condition" includes a condition of the vehicle while the vehicle is stationary with its engine placed in its idling condition. According to a predetermined or known relationship between the running condition of the vehicle and the phase difference θ of the control pulse signal P, which relationship has been experimentally obtained from measurements of these two factors, the phase difference θ of the control pulse signal P with respect to the ignition pulse signal R is determined, depending upon the value represented by the running condition signal S. The above-indicated relationship is stored in the ROM. In the present embodiment, the controller 80 functions as a phase modulator for determining and adjusting the pha se difference θ of the control pulse signal P based on the above-indicated running condition signal S.

The thus obtained control pulse signal P is subjected to an amplitude modulation depending upon the running condition of the vehicle, to thereby obtain the coil drive pulse signal E to be applied to the coil 74, while signal E maximizes the vibration damping effect of 25 a the engine mount 10 with respect to the specific vibration of the body 20. Since characteristics of the vibration of the body 20 vary depending upon the running or driving condition of vehicle as described above, again control signal C is obtained, so as to determine the amplitude of the coil drive pulse signal E, based on a predetermined or known relationship between the vehicle running condition and the amplitude of the vibration of the body 20, which relationship has been experimentally obtained from measurements of these two factors. This relationship is also stored in the ROM. Based on this gain control signal S, again controller 82 provided between the power source 78 and the coil 74 operates to effect amplitude modulation of the control pulse signal P so that the peak voltage or amplitude of the coil drive pulse signal E is optimized to damp the input vibration. Described more specifically a switching means 84 is disposed between the gain controller 82 and the coil 74 as shown in FIG. 2, and the voltage application from the gain controller 82 to the coil 74 of the engine mount 10 is controlled by turned on and off the switching means 84 according to ON/OFF states of the control pulse signal P, and such that the level of the voltage applied to the coil 74 is determined by the gain control signal G. As a result, the coil drive pulse signal E has a phase, a duty ratio and a frequency which are determined by the control pulse signal P, and has an amplitude determined by the gain control signal G. This switching means 84 may be preferably a known switching means such as a transistor such as a field effect transistor (FET). In the present embodiment, the controller 80 also functions to determine the gain control signal G based on the above-indicated running condition signal S, while the gain controller 82 and the switching means 84 cooperate to function as a gain controller.

In the present embodiment, the voltage to be supplied from the power source 78 to the coil 74 is regulated by the gain controller 82 which is adapted to effect pulse duration (width) modulation (PWM) based on the gain control signal G received from the controller 80. The PWM control permits effective regulation of the voltage applied to the coil 74, that is the amplitude of the electric coil drive pulse signal E with high response and accuracy. The PWM control permits the amplitude regulation of the electric coil drive pulse signal E for cycle of control, as shown in FIG. 3.

In the present embodiment, the controller 80 is adapted to determine the phase difference θ of the control pulse signal P and the gain control signal G depending upon the running condition signal S, preferably according to stored data maps, i.e., a data map representing a relationship between the vehicle running condition and the phase difference θ of the control pulse signal P and a data map representing a relationship between the vehicle running condition and the amplitude of the vibration of the body 20. The data maps are obtained based on values of the phase difference θ and the vibration amplitude which were actually measured by changing the value of the running condition signal S in steps. The thus obtained data maps are stored in the ROM of the controller 80. Based on the value of the received signal S, the CPU of the controller 80 selects the corresponding values of the phase difference θ and the gain control signal G according to the respective data maps. That is, the CPU controls the phase difference 0 and the gain control signal G in an open-loop control fashion.

As is apparent from FIG. 3, the coil drive pulse signal E generated by the control device constructed as described above is a digital ON/OFF signal having a duty ratio of 0.5. This ON/OFF signal E is applied to the coil 74 of the engine mount to generate the above-indicated electromagnetic force in a periodic manner, whereby the oscillating plate 48 is displaced or oscillated by the oscillating movement of the coil 74 by the electromagnetic force. The coil drive pulse signal E applied to the coil 74 causes the electromagnetic force to be generated when the coil drive pulse signal E is in its ON state, so that the oscillating plate 48 is displaced in the upward or downward direction. On the other hand, when the pulse signal E is in its OFF state, no electromagnetic force is generated, so that the oscillating plate 48 is restored to its original position by an elastic force of the elastic support 50. With the cooperation of the electromagnetic force and the elastic force applied to, the oscillating plate 48 is effectively oscillated in the vertical direction such that the frequency and amplitude correspond to those of the coil drive pulse signal E.

As a result, the fluid pressure in the auxiliary fluid chamber 56 changes according to the oscillation of the oscillating plate 48. Where the pressure change in the auxiliary fluid chamber 56 is transmitted to the primary fluid chamber 54 based on the flows of the fluid through the orifice passage 64, an abrupt change in the pressure of the auxiliary chamber 56 which takes place due to the alternating ON and OFF states of the pulse signal E is moderated by the flow of the fluid through the orifice passage 64, so that the pressure in the primary fluid chamber is comparatively smoothly changed. Thus, the waveform of the fluid pressure change in the primary chamber 54 is relatively similar to that of a sine wave. Accordingly, the engine mount 10 is capable of exhibiting an improved active damping effect with respect to the vibration of the body 20.

Since the oscillating plate 48 is supported by the elastic support member 50 in the present embodiment, the pressure change in the auxiliary fluid chamber 56 upon oscillation of the oscillating plate 48 is delayed due to a damping force generated by the elastic support member 50. Accordingly, the abrupt change in the pressure in the auxiliary chamber 56 is further restricted, assuring a comparatively smooth change of the fluid pressure in the primary fluid chamber 54, resulting in an excellent damping effect of the engine mount 10 with respect to the vibration of the body 20.

In the present embodiment, a digital ON/OFF pulse signal in the form of the control pulse signal P is employed as the coil drive signal E. This arrangement eliminates a sine wave generating circuit and a phase adjusting circuit for sine wave, permitting the control device to be simple in construction and economical to manufacture. In particular, while the conventional control device for generating the sine-wave drive signal requires a central processing unit having a capacity as large as 16–32 bits, the controller 80 of the present embodiment is operable with the CPU of 8 bits which is available at a low cost.

In addition, the fluid pressure change in the primary fluid chamber 54, is not directly caused by the displacement or oscillation of the oscillating plate 48, but is caused indirectly through the auxiliary fluid chamber 56 and the orifice passage 64. In this arrangement, the orifice passage 64 which is tuned to a desired resonance frequency of the fluid flowing therethrough permits only the fluid pressure change in the primary fluid chamber 54 at a frequency equal to or lower than its resonance frequency, while effectively restricting the fluid pressure change in the primary fluid chamber 54 at a frequency higher than its resonance frequency. Thus, the present engine mount 10 is effective to prevent an undesirable active damping effect due to generation of higher harmonics of the resonance frequency (frequency of the vibration to be damped).

Figure 4:
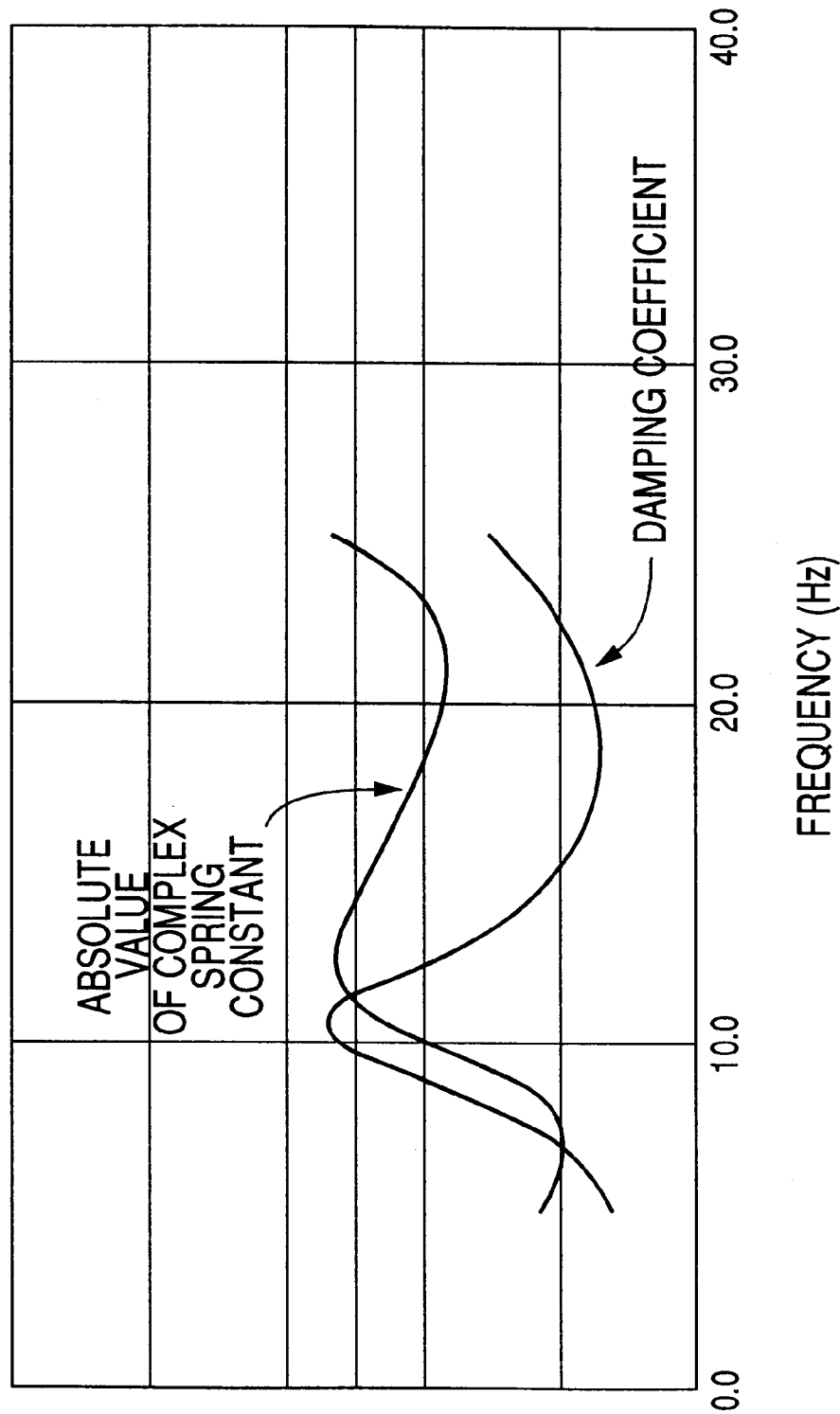
FIG. 4 is a graph showing frequency characteristics of an orifice passage of the engine mount of FIG. 1, which is tune to a specific frequency band.
Figure 5:
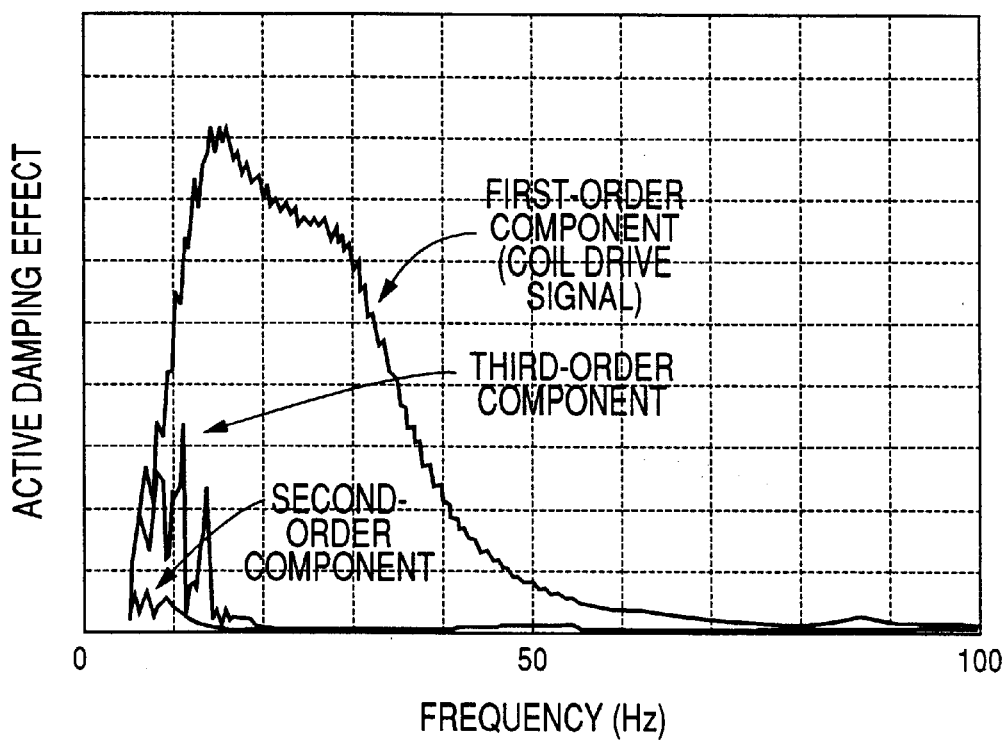
FIG. 5 is a graph showing measured frequency characteristics of an active vibration damping effect of the engine mount of FIG. 1 which has the orifice passage tuned so as to exhibit the characteristics of FIG. 4.

When the engine mount 10 is required to exhibit a desired active damping effect by positively oscillating the oscillating plate 48 with respect to an engine idling vibration, for example, the orifice passage 64 is tuned to the frequency of the engine idling vibration, e.g., about 20 Hz, so that the absolute value of complex spring constant of the orifice passage 64 is minimized at about 20 Hz, as shown in FIG. 4. In this case, the active damping effect provided by the oscillation of the oscillating plate 48 is maximized with respect to the engine idling vibration when the oscillation frequency corresponds to the frequency of the engine idling vibration, as shown in FIG. 5. However, it is possible to minimize an unfavorable active vibration damping effect due to the higher harmonics (second-order and third-order components) of frequency of the coil drive pulse signal E for oscillating of the oscillating plate 48, as also shown in FIG. 5. With the oscillating plate 48 positively oscillated at the frequency corresponding to that of the engine idling vibration, the present engine mount 10 can exhibit excellent active damping effect with respect to the engine idling vibration, while the undesired active vibration damping effect due to generation of the higher harmonics of the first-order frequency component of the coil drive pulse signal E.

A specimen of the engine mount 10 whose orifice passage 64 is tuned to the frequency of the engine idling vibration was prepared. The oscillating plate 48 is actively or positively oscillated by applying electric coil drive pulse signals having different frequencies, and there were obtained ratios of active damping effects due to the second- and third-order components of the oscillation frequency of the oscillating plate 48 to an active damping effect due to the first-order component. The obtained ratios are indicated in the following Table 1, and a graph of FIG. 6. For comparison, the oscillating plate 48 is positively oscillated by applying coil drive sine-wave signals having respective different frequencies. The above-indicated ratios of the sine-wave signals are also indicated in Table 1 and the graph of FIG. 6.

orifice passage 64, a resistance to flow of the fluid through the orifice passage tends to increase, making it difficult for the engine mount 10 to exhibit a sufficient active damping effect due to the first-order component of the oscillation frequency of the oscillating plate 48. In view of the above results, the tuning frequency F of the orifice passage 64 is preferably determined with respect to a lowest oscillation frequency f' of the oscillating plate 48, so as to satisfy the following formula: F(Hz)=f'+5 (Hz). In this respect, the lowest oscillation frequency f' is the lower limit of a frequency band of the vibration to be damped by the engine mount 10.

Figure 7:
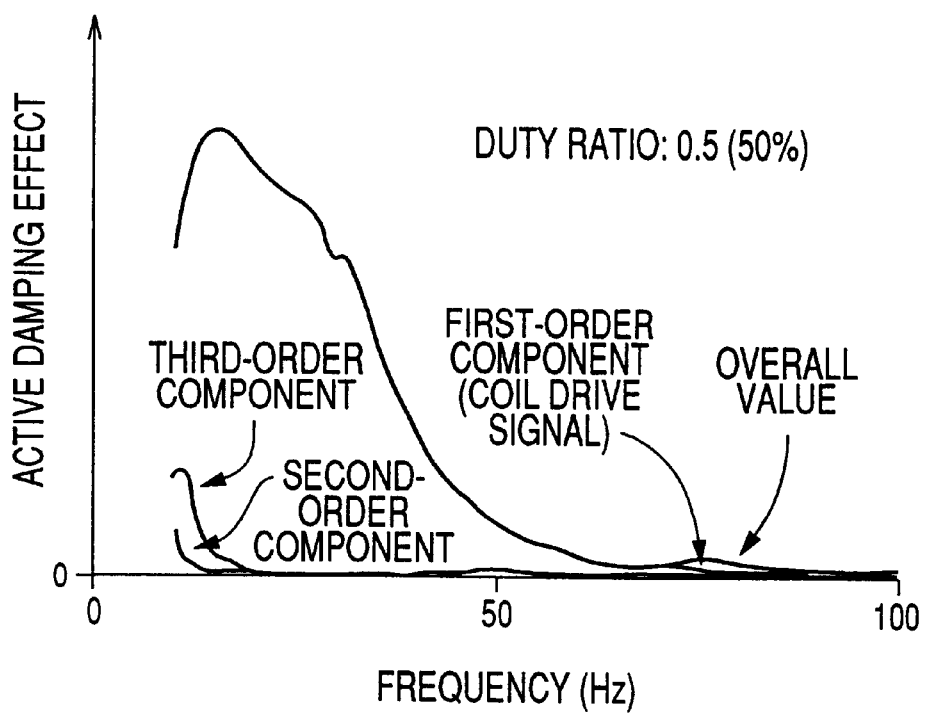
FIG. 7 is a graph showing frequency characteristics of the active vibration damping effect of the engine mount of FIG. 1 when the drive means is actuated by an electric drive signal having a duty ratio of 0.5.
Figure 8:
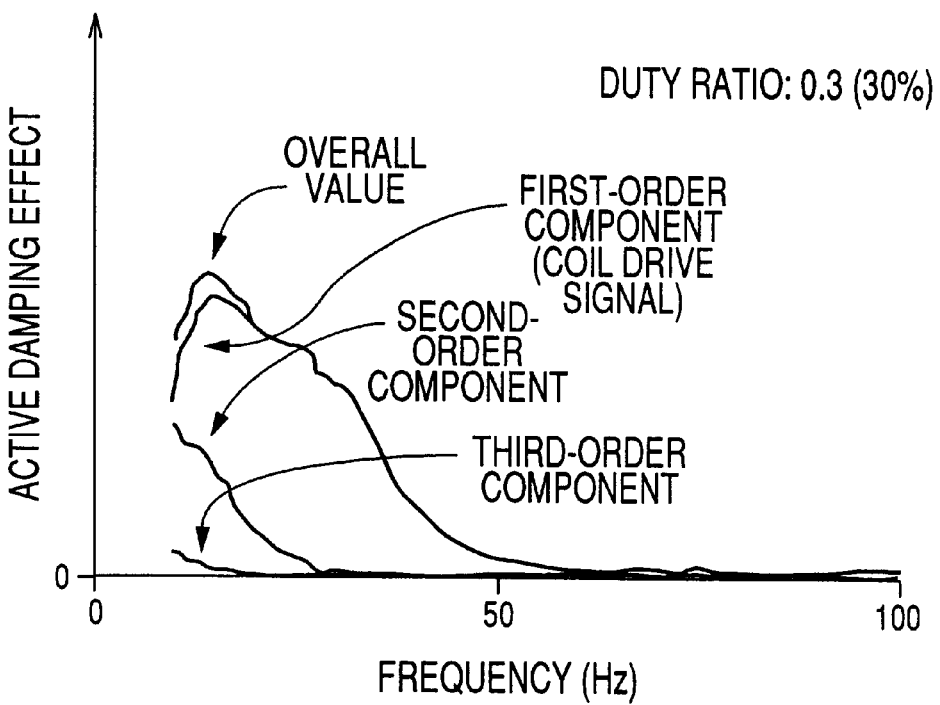
FIG. 8 is a graph showing frequency characteristics of the active vibration damping effect of the engine mount of FIG. 1 when the drive means is actuated by an electric drive signal having a duty ratio of 0.3.

In the engine mount 10 of the present embodiment, the duty ratio of the coil drive pulse signal E is determined to be 0.5 (50%). This arrangement is effective to minimize the adverse influence of the higher harmonics of the oscillation frequency of the oscillating plate 48 upon active oscillation of the oscillating plate 48, resulting in preventing deterioration of the active vibration damping effect with respect to the high-frequency vibrations, and leading to a further improvement of the vibration damping effect with respect to the desired vibration frequency band. The engine mount 10 was operated under the control of the control device of FIG. 2 with the coil drive pulse signal E having the duty ratio of 0.5, and with the coil drive pulse signal E having the duty ratio of 0.3. In both cases, the active vibration damping effects due to the first-, second- and third-order components of the oscillation frequency of the oscillating plate 48 were measured. The measurements are indicated in the graphs of FIGS. 7 and 8. The measurements were effected with the orifice passage 64 which has been tuned to 20 Hz. As is apparent from the graphs, the coil drive pulse signal E whose duty ratio is 0.5 permits a significant reduction of the undesirable effect due to the higher harmonics of the oscillation frequency of the oscillating plate 48, assuring an excellent active vibration damping effect owing to the first-order component of the oscillation frequency.

Moreover, the engine mount 10 constructed according to the present embodiment includes the communication fluid

TABLE 1

| Oscillation frequency of Oscillating Plate | Pulse signals | | | Sine-wave signals | | |
|---|---|---|---|---|---|---|
| | 1st-order Comp. | 2nd-order Comp. | 3rd-order Comp. | 1st-order Comp. | 2nd-order Comp. | 3rd-order Comp. |
| 10 Hz | 0.4499 | 0.0788 | 0.2087 | 0.4499 | 0.0085 | 0.0808 |
| 15 Hz | 0.6635 | 0.0855 | 0.0462 | 0.6640 | 0.0132 | 0.0177 |
| 20 Hz | 0.6584 | 0.0315 | 0.0179 | 0.6591 | 0.0051 | 0.0060 |
| 25 Hz | 0.7336 | 0.0162 | 0.0075 | 0.7381 | 0.0034 | 0.0028 |
| 30 Hz | 0.6233 | 0.0062 | 0.0068 | 0.6289 | 0.0023 | 0.0017 |
| 40 Hz | 0.2431 | 0.0078 | 0.0227 | | | |

Figure 6:
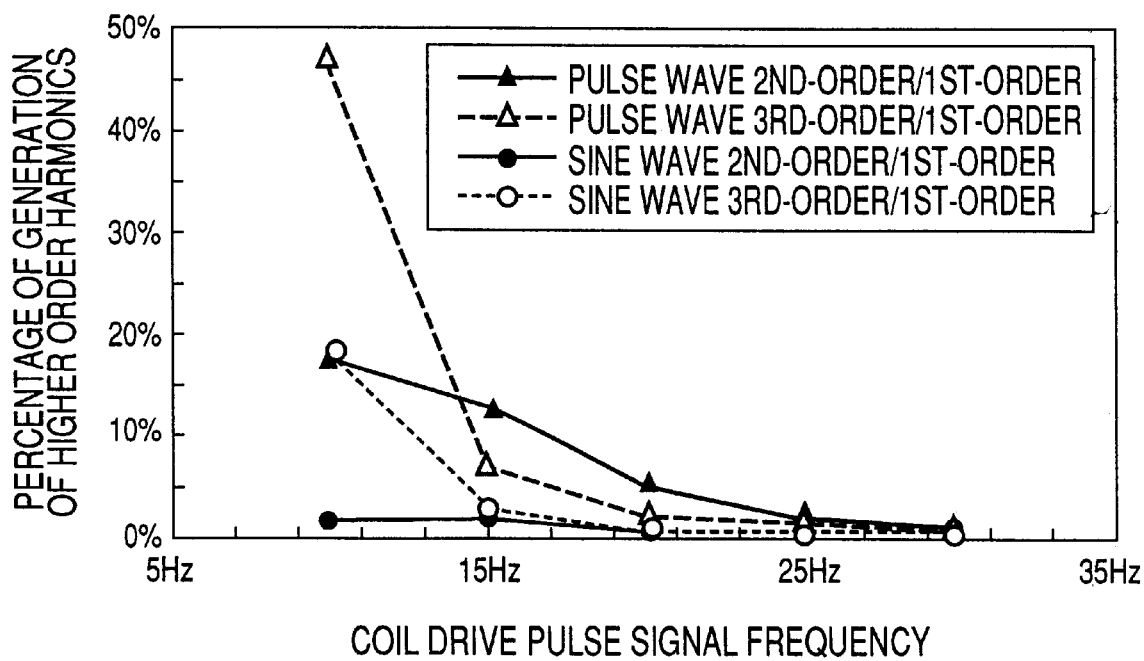
FIG. 6 is a graph showing a percentage of generation of higher harmonics (second- and third-order components) of a coil drive pulse signal (first-order component) for generating the oscillating force in the case of the graph of FIG. 5.

As is apparent from Table 1 and the graph of FIG. 6, when the frequency F (20 Hz) to which the orifice passage 64 is tuned and the oscillation frequency f of the oscillating plate 48 satisfy an equation f>3/4F, the ratio of the higher harmonics of the oscillation frequency of the oscillating plate 48 is 15% or lower. In particular, when the oscillating plate 48 is oscillated at a frequency which is equal to or higher than the tuning frequency F of the orifice passage 64, the ratio of the higher harmonics is significantly low, namely, as low as in the comparative examples where the sine-wave signals were applied to positively oscillate the oscillating plate 48. When the vibration frequency f of the oscillating plate 48 is three or more times the tuning frequency F of the passage 35 which is tuned to a frequency band lower than the frequency band to which the orifice passage 64 is tuned. This arrangement assures that engine mount 10 exhibits an excellent vibration damping effect with respect to vibrations of relatively low frequencies, such as an engine shake having a frequency of about 10 Hz, owing to the resonance of the fluid flowing through the fluid communication passage 35. In this respect, it is noted that the orifice passage 64 is not effective to damp such low vibrations of about 10 Hz in the presence of the higher harmonics. Further, the primary fluid chamber 54 is connected through the communication passage 35 to the equilibrium chamber 30 which is partially defined by the flexible diaphragm 28, so that an increase in the fluid pressure of the equilibrium chamber 30 is effectively absorbed by the deformation or displacement of the flexible diaphragm 28. Upon installation of the engine mount 10 on the vehicle, the fluid pressures in the primary and auxiliary fluid chambers 54, 56 are increased due to the weight of the power unit 18 acting on the engine mount 10. These fluid pressure increases in the primary and auxiliary fluid chambers are also absorbed by the deformation or displacement of the flexible diaphragm 28 of the equilibrium chamber 30, resulting in improved durability of the engine mount 10, and increased stability of control of the pressure change in the primary fluid chamber 54 induced by the oscillation of the oscillating plate 48, in other word, increased stability of control of the active vibration damping effect of the engine mount 10.

The engine mount 10 of the present embodiment includes the electromagnetic drive means of voice-coil type for oscillating the oscillating plate 48. This voice-coil type electromagnetic drive means can exhibit a linear relationship between its output (electromagnetic force) and its input (coil drive pulse signal E) over a wider range of its input and output, than an electromagnetic drive means of electromagnet type, making it possible to accurately control the oscillation of the oscillating plate 48 with ease, resulting in a further improvement of the vibration damping effect of the engine mount 10.

While the presently preferred embodiment of the present invention has been described above in detail for illustrative propose only, it is to be understood that the present invention is not limited to the details of the illustrated embodiment, but may be otherwise embodied.

Figure 9:
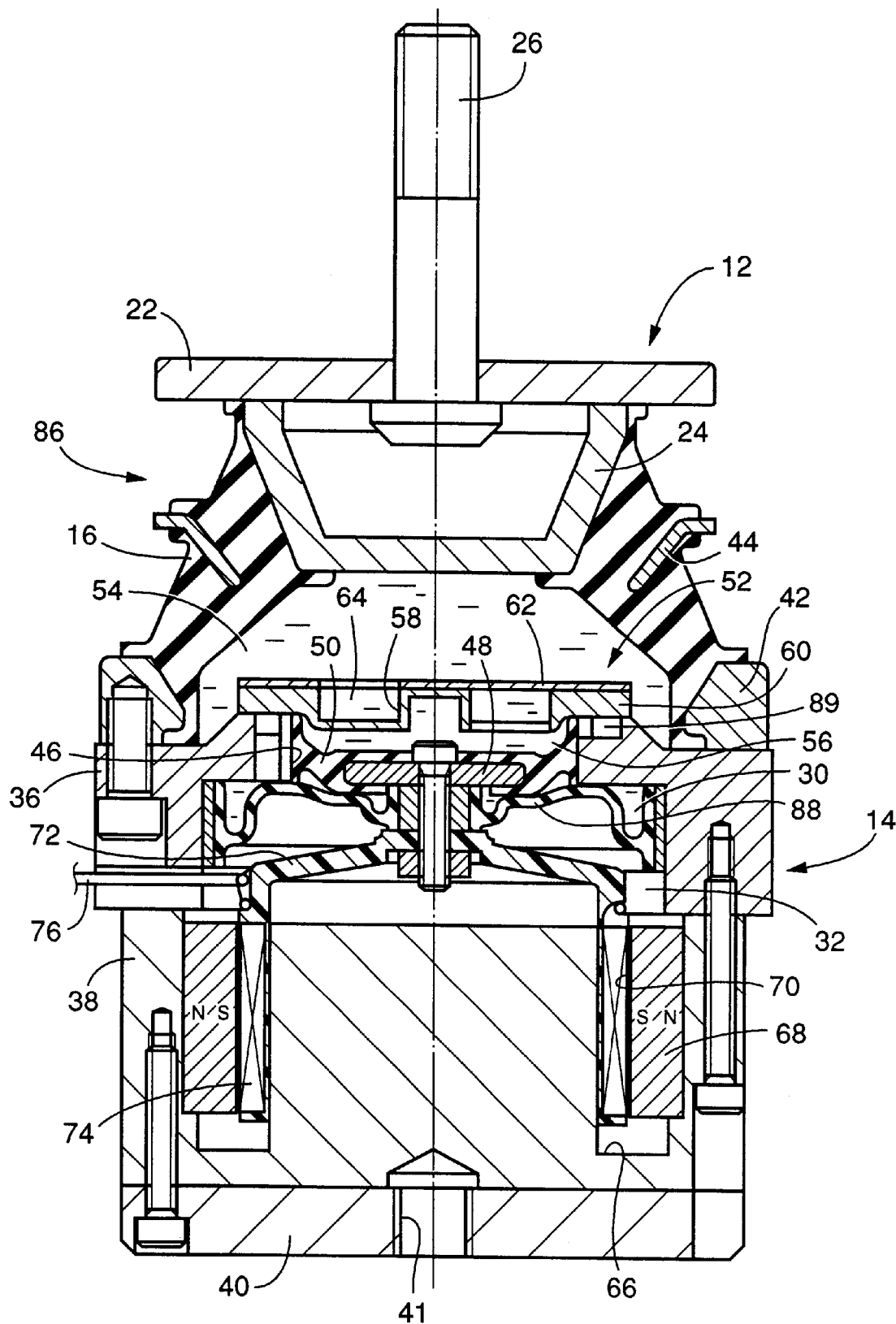
FIG. 9 is an elevational view in axial or vertical cross section of a fluid-filled vibration damping device of an active vibration damping system in the form of an engine mount constructed according to a second embodiment of this invention.

The construction of the engine mount of the present invention is not limited to that of the illustrated embodiment, for example. The present invention may employ another preferred embodiment of an engine mount 86 as shown in FIG. 9. The elements similar in construction to those in the first embodiment are denoted by the same reference numerals as used in the first embodiment, and the detailed explanation about these elements is omitted. The engine mount 86 constructed according to the second embodiment includes an flexible diaphragm 88 which is disposed within the axially lower portion of the center bore 46 of the support member 36, such that the flexible diaphragm 88 is opposed to the oscillating plate 48 disposed within the axially central portion of the center bore 48 with a suitable axial spacing therebetween. This axial spacing between the flexible diaphragm 88 and the oscillating plate 48 provides the equilibrium chamber 30. On the other hand, the cylindrical support member 36 is formed with a fluid communication passage 89 for fluid communication between the equilibrium chamber 30 and the auxiliary fluid chamber 56. Like the fluid communication passage 35 of the first embodiment, the fluid communication passage 89 is tuned to a frequency band lower than the frequency band to which the orifice passage 64 is tuned. This passage 82 functions as a second orifice passage. Thus, the engine mount 86 constructed as described above exhibits the same vibration damping effect as the engine mount 10 of the first embodiment, when it is controlled by the control device of FIG. 2.

Further, the present invention may be embodied with the fluid chamber which is located outside the main body of vibration damping device as disclosed in JP-A-8-177958. The vibration damping device of the present invention may use a fluid chamber which is located outside the main body and which functions as the auxiliary fluid chamber.

The fluid-filled vibration damping device of the present invention may be a cylindrical mount including a center shaft member and a cylindrical member disposed radially outwardly of the center shaft member with a suitable radial spacing therebetween, which members are elastically connected to each other with an elastic body interposed therebetween. The fluid-filled vibration damping device of the present invention may be used as a damper fixed solely to an oscillating member so as to damp its vibration. For instance, a damper similar to the illustrated engine mount 10, 86 may be mounted on the oscillating member which may be a vehicle body member or an exhaust pipe via only one of the first and second mounting members 12, 14, while the other of the mounting members 12, 14 is not connected to any member, so that the damper is freely vibratile.

While the oscillating plate 48 is supported by an elastic body in the form of the annular elastic support 50 in the illustrated embodiments, the oscillating plate 48 may be supported by a plate spring, diaphragm or any other flexible member.

The fluid communication passage 35 is not essential. The fluid communication passage 35 may have a cross section area of fluid flow which is small enough to inhibit flows of the fluid therethrough even upon application of a vibration of a relatively low frequency to the engine mount. In this case, the communication passage 35 functions as a passage permitting the flow of the fluid therethrough for absorbing a pressure increase in the pressure chamber due to the static load acting on the engine mount, namely, due to the weight of the power unit 18.

Figure 10:
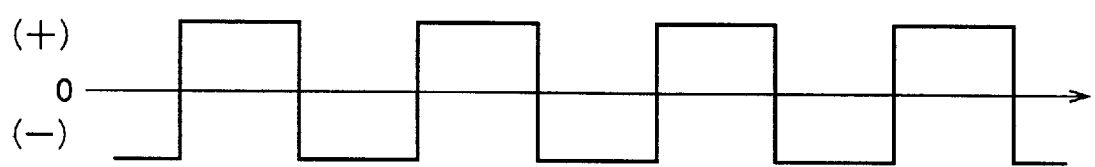
FIG. 10 is a graph showing the waveform of a control pulse signal generated by control device in one modified form of the arrangement of FIG. 2.

In the illustrated embodiments, the electric coil drive signal E generated by the control device is a digital ON/OFF pulse signal. However, the coil drive signal E may be a pulse signal having opposite polarities as shown in FIG. 10. In this case, the switching means 84 preferably consists of a known H-bridge circuit.

While the oscillating force for oscillating the oscillating plate 48 is controlled by a driveing force regulator in the form of the gain controller 82 for adjusting the amplitude of the coil drive pulse signal E in the illustrated embodiments, there may be employed a duty ratio controller for adjusting the duty ratio of the pulse signal E in place of or in addition to the gain controller 82. In this case, the moment of rise of each pulse is desirably adjusted according to the duty ratio, so that the interpulse period (time interval between the centers of the adjacent pulses) is modulated so as to correspond to the period of the vibration to be damped with high accuracy. In this case, the waveform of the oscillating force for the oscillating plate 48 accurately corresponds to that of the vibration to be damped.

Figure 11:
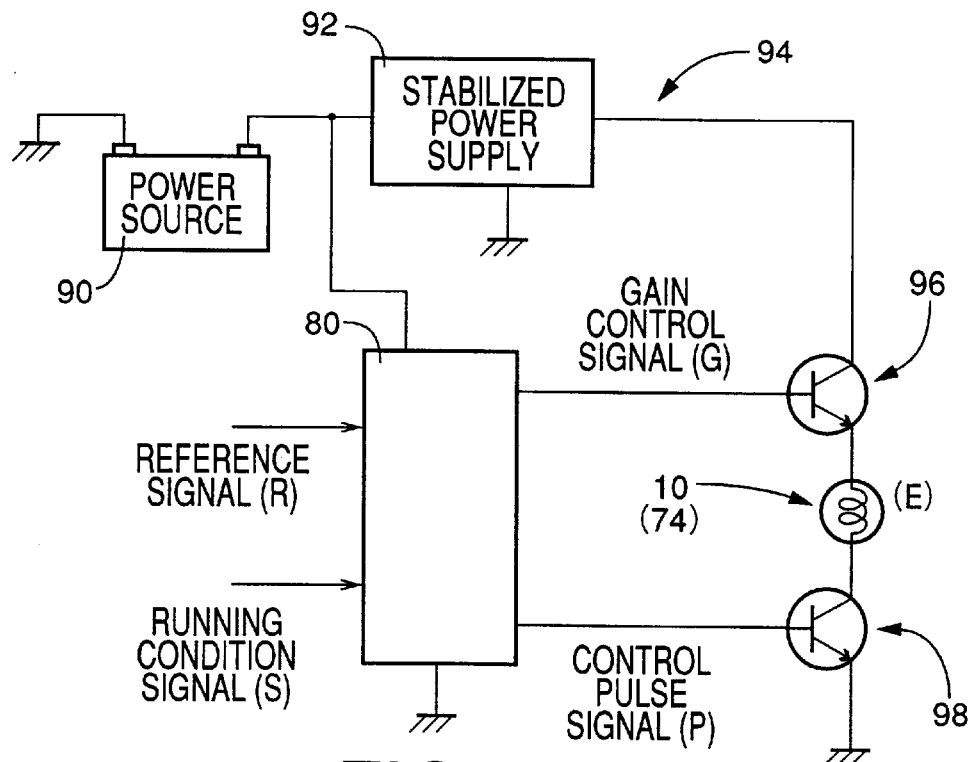
FIG. 11 is a block diagram showing another arrangement of a control device in place of the arrangement of FIG. 2.
Figure 12:
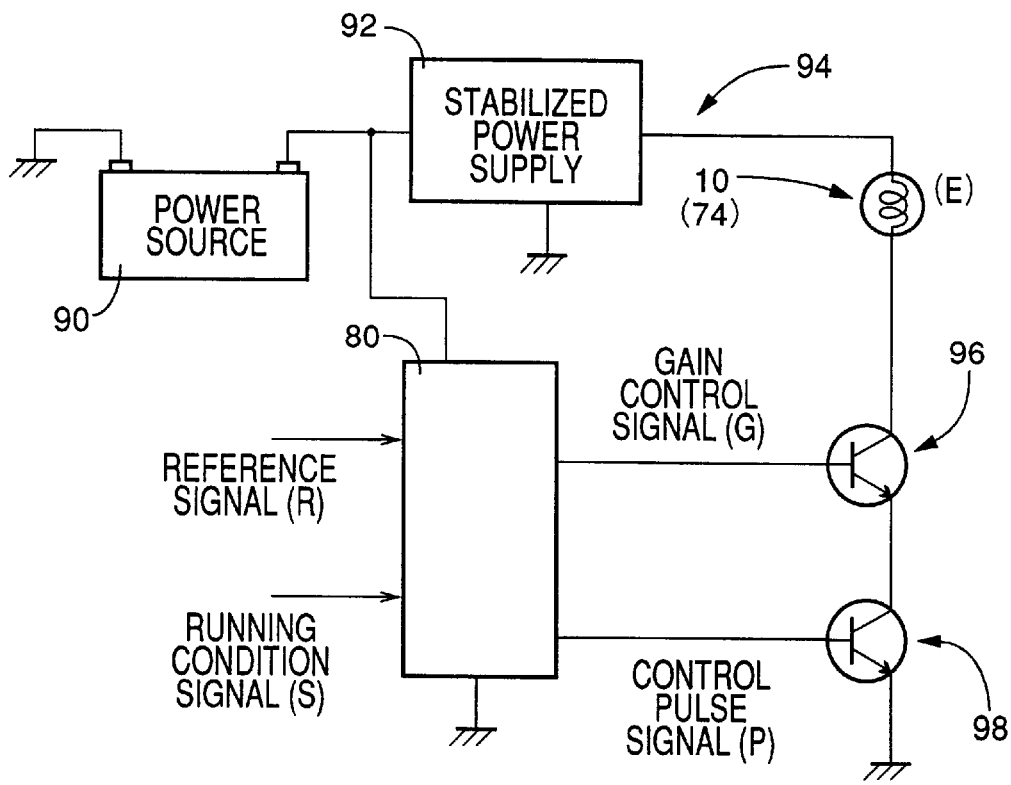
FIG. 12 is a block diagram showing a further arrangement of a control device in place of the arrangement of FIG. 2.
Figure 13:
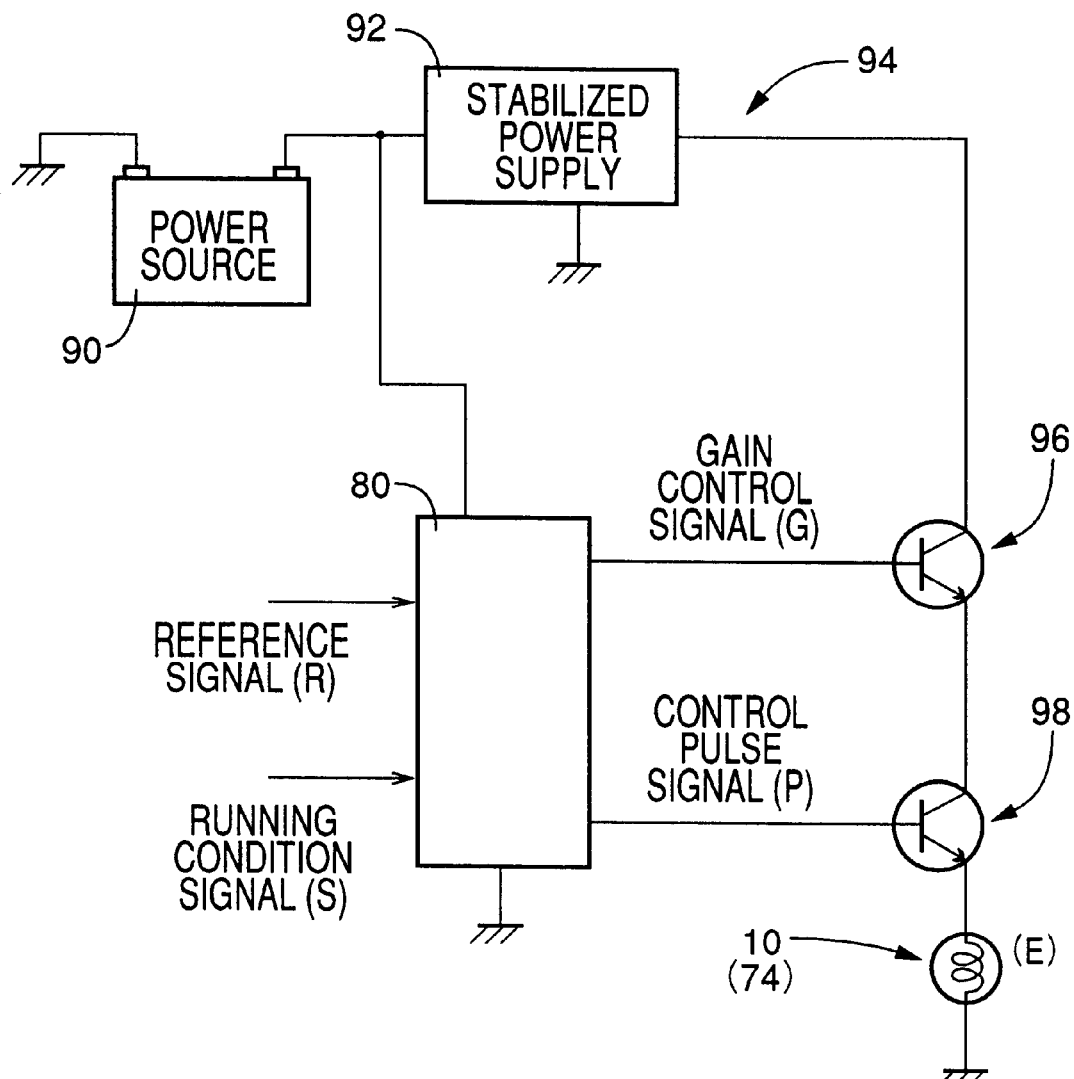
FIG. 13 is a block diagram showing a yet further arrangement of a control device in place of the arrangement of FIG. 2.

The gain controller 82 and the switching means 84 shown in the block diagram of FIG. 2 use transistors having a switching function. FIGS. 11–13 show respective different arrangement of the control device of FIG. 2. In these arrangements shown in FIGS. 11–13, the same reference signs as used in FIG. 2 will be used to identify the corresponding elements, for easy comprehension.

In the control arrangements shown in FIG. 11–13, the reference numeral 94 denotes an power supply circuit for applying the coil drive pulse signal E from a power source 90 to the coil 74 of the engine mount 10 via a stabilized power supply 92. The power supply circuit 94 includes a first transistor 96 functioning as the gain controller 82 for regulating the amplitude of the coil drive pulse signal E on the basis of the gain control signal (G) received from the controller 80 according to the running condition S, and a second transistor 98 functioning as the switching means 84 for regulating the frequency and phase of the pulse signal E on the basis of the control pulse signal (P) according to the reference signal (R) and the running condition signal (S). Described more specifically, the gain control signal (G) is applied to the base of first transistor 96. According to the gain control signal (G), the power supply circuit 94 is opened and closed, so that the amplitude of the coil drive pulse signal (E) is controlled to regulate the voltage applied to the coil 74. On the other hand, the control pulse signal (P) is applied to the base of second transistor 98. This signal (P) is generated by the controller 80 on the basis of the reference signal R and the running condition signal S and has a frequency and a phase difference θ corresponding to those of the vibration to be damped. According to the control pulse signal (P), the power supply circuit 94 is opened and closed, whereby the coil drive pulse signals (E) is controlled in terms of its frequency, phase difference and duty ratio, based on the control pulse signal (P).

Accordingly, the control device of FIG. 2 used for the vibration damping system of the present invention can be constituted by any one of the electric control arrangements illustrated in FIGS. 11–13. As is apparent from foregoing explanation, the coil 74 of the engine mount 10 can be located at any portion of the power supply circuit 94. Preferably, the electric circuits of FIGS. 11 and 12 are employed for improved stability of operation of the first and second transistors 96 and 98.

While the phase modulator, the duty ratio limiter and other means are constituted by a microcomputer in the form of the controller 80 in the illustrated embodiments, these means may be constituted by an electric circuit incorporating discrete components. For instance, the phase modulator may be constituted by a phase adjusting device using a thyristor, a phase shifter or other electric circuit. On the other hand, the duty ratio limiter may be constituted by a comparator, and a known delay circuit using two single-shot multivibrators or a D-F, F type multivibrator, for example. More specifically described, the ignition pulse signal R is converted into a digital signal by the comparator, and the digital signal is processed by the delay circuit. In this case, the delay circuit may use a variable resistor, so that the phase of the control pulse signal P is preferably adjusted by changing a resistance value of the resistor.

It is to be understood that the present invention may be made with various other changes, modifications and improvements, which may occur to those skilled in the art, without departing from the spirit and scope of the invention defining in the following claims:

What is claimed is:

1. An active vibration damping system for damping vibration of a subject member, comprising:

a fluid-filled vibration damping device including an elastic body partially defining a primary fluid chamber filled with a non-compressible fluid, said elastic body being elastically deformed so as to cause a change in a pressure of said fluid in said primary fluid chamber, upon application of a vibrational load from said subject member, an oscillating plate partially defining an auxiliary fluid chamber filled with said non-compressible fluid, a drive means for generating a driving force for oscillating said oscillating plate so as to cause a change in a pressure of said fluid in said auxiliary fluid chamber, and a first orifice passage for fluid communication between said primary and auxiliary fluid chambers; and a control device applying an electric drive pulse signal to said drive means for controlling oscillation of said oscillating plate, said control device including a pulse signal generator for generating a control pulse signal whose frequency corresponds to that of said vibration of said subject member, a phase modulator for modulating a phase of said control pulse signal depending upon a condition of said vibration of said subject member, and a driving force regulator for adjusting a waveform of said control pulse signal to obtain said electric drive pulse signal so that said driving force generated by said drive means corresponds to an amplitude of said vibration of said subject member, said drive means generating said driving force such that said driving force corresponds to an amplitude of said electric drive pulse signal applied to the drive means.

2. An active vibration damping system according to claim 1, wherein said driving force regulator comprises a gain controller for adjusting an amplitude of said control pulse signal (P) according to said amplitude of said vibration of said subject member.

3. An active vibration damping system according to claim 2, wherein said gain controller includes a stabilized power supply as a power source.

4. An active vibration damping system according to claim 1, wherein said driving force regulator comprises a duty ratio controller for adjusting a duty radio of said control pulse signal (P) according to said amplitude of said vibration of said subject member.

5. An active vibration damping system according to claim 1, wherein said driving force regulator comprises a duty ratio limiter for limiting the duty ratio of said control pulse signal to within a range of 40%–60%.

6. An active vibration damping system according to claim 5, said duty ratio limiter controls said control pulse signal so as to have a duty ratio of 50%.

7. An active vibration damping system according to claim 1, wherein said oscillating plate of said fluid-filled vibration damping device is elastically supported by an elastic support which is elastically deformable so as to permit displacement of said oscillating plate.

8. An active vibration damping system according to claim 7, wherein said elastic support partially defines said auxiliary fluid chamber.

9. An active vibration damping system according to claim 1, wherein said vibration damping device further comprises a flexible diaphragm partially defining an equilibrium fluid chamber, and a second orifice passage for fluid communication between said equilibrium fluid chamber and one of said primary and auxiliary fluid chambers, said second orifice passage being tuned to a frequency band lower than the frequency band to which the first orifice passage is tuned.

10. An active vibration damping system according to claim 1, wherein said damping device further comprises a first and a second mounting member which are spaced apart from each other and are connected to each other by said elastic body interposed therebetween, and a partition member supported by said second mounting member and separating said primary and auxiliary fluid chambers from each other such that said primary fluid chamber is located on one of opposite sides of said partition member while said auxiliary fluid chamber is located on the other side of said partition member, said second mounting member supporting said drive means, one of said first and second mounting members being fixed to said subject member whose vibration is damped by said vibration damping system.

11. An active vibration damping system according to claim 1, wherein said subject member is connected through said fluid-filled vibration damping device to an internal combustion engine in a vibration damping fashion, and said pulse signal generator of said control device generates said control pulse signal corresponding to an cranking angle of said internal combustion engine.

12. An active vibration damping system according to claim 1, wherein said subject member is connected through said fluid-filled vibration damping device to an internal combustion engine in a vibration damping fashion, and said pulse signal generator of said control device generates said control pulse signal corresponding to an ignition timing of said internal combustion engine.

13. An active vibration damping system according to claim 1, wherein a frequency "f" of oscillation of said oscillation plate and a frequency "F" to which the first orifice passage is tuned so as to exhibit a relatively low absolute value of complex spring constant of said damping device are determined so as to satisfy a relationship represented by the following formula: $3F/4 \leq f \leq 3F$.

14. An active vibration damping system according to claim 13, wherein said frequency "F" is within a range of ±5 Hz of the vibration frequency to be damped.

15. An active vibration damping system according to claim 1, wherein said control device further comprises a memory means for storing a first data map representing a predetermined first relationship between different phases of said control pulse signal determined by said phase modulator and respective different conditions of said vibration of said subject member, and a second data map representing a predetermined second relationship between different waveforms of said electric drive pulse signal obtained by said drive force regulator and respective different values of said amplitude of said subject member, wherein said phase modulator determines the phase of said control pulse signal according to said predetermined first relationship and based on a first monitoring signal indicating said condition of said vibration of said subject member, and said driving force regulator determines the waveform of said electric drive pulse signal according to said predetermined second relationship and based on a second monitoring signal indicating said amplitude of the vibration of said subject member.

16. An active vibration damping system according to claim 15, wherein said subject member is a part of an automotive vehicle, and said fist and second monitoring signals are selected from among signals indicating: an operating speed of an engine of the vehicle; a shift lever position of the vehicle; a running speed of the vehicle; a throttle opening angle of the vehicle; a water temperature of said engine; an oil temperature of the vehicle; and a temperature of said elastic body.

* * * * *